(12) United States Patent
Wong et al.

(10) Patent No.: US 7,957,112 B2
(45) Date of Patent: Jun. 7, 2011

(54) PROTECTION CIRCUIT FOR LIMITING OPERATING POWER OF ELECTRICAL DEVICE AND METHOD THEREOF

(76) Inventors: Memie Mei Mei Wong, New Territories (HK); Sam Yun Sum Wong, Kowloon (HK)

(*) Notice: Subject to any disclaimer, the term of this patent is extended or adjusted under 35 U.S.C. 154(b) by 448 days.

(21) Appl. No.: 12/141,319

(22) Filed: Jun. 18, 2008

(65) Prior Publication Data
US 2009/0316318 A1      Dec. 24, 2009

(51) Int. Cl.
*H02H 5/00*       (2006.01)
(52) U.S. Cl. .......................................................... 361/86
(58) Field of Classification Search .................... 361/56, 361/86, 80, 79
See application file for complete search history.

(56) References Cited

U.S. PATENT DOCUMENTS

| | | | |
|---|---|---|---|
| 4,771,357 A * | 9/1988 | Lorincz et al. | 361/87 |
| 5,815,351 A * | 9/1998 | Ashok et al. | 361/18 |
| 6,249,411 B1 * | 6/2001 | Hemena et al. | 361/91.5 |
| 2004/0070908 A1* | 4/2004 | Corcoran et al. | 361/93.1 |
| 2008/0043384 A1* | 2/2008 | Chu | 361/23 |

* cited by examiner

*Primary Examiner* — Jared J Fureman
*Assistant Examiner* — Angela Brooks
(74) *Attorney, Agent, or Firm* — Leydig, Voit & Mayer, Ltd.

(57) ABSTRACT

A protection circuit limits operating power supplied to an electrical device from an electrical power source below a predetermined power rating. The protection circuit comprises a switching device for adjusting electrical power supplied from the power source to the electrical device; a sensor sensing a parameter relating to the operating power; and a comparator comparing the parameter sensed by the sensor and, in response to identifying an undesirable operating condition, controlling the switching device to adjust electrical power supplied to the electrical device to below a predetermined power rating.

28 Claims, 18 Drawing Sheets

100% "duty cycle" of AC Power 93.75% "duty cycle" of AC Power

Phase Angle 11.25° Turn-On
Zero Crossing Turn-Off 87.5% "duty cycle" of AC Power Phase Angle 22.5° Turn-On
Zero Crossing Turn-Off 81.25% "duty cycle" of AC Power Phase Angle 33.75° Turn-On
Zero Crossing Turn-Off

| % of Duty Cycle Used | % of Power Used |
|---|---|
| 100.00% | 100.00% |
| 75.00% | 90.92% |
| 50.00% | 50.00% |
| 25.00% | 9.09% |

FIG. 17

| % of Duty Cycle Used | % of Power Used |
|---|---|
| 100.00% | 100.00% |
| 93.75% | 99.84% |
| 87.50% | 98.75% |
| 81.25% | 95.95% |
| 75.00% | 90.92% |
| 68.75% | 83.46% |
| 62.50% | 73.76% |
| 56.25% | 62.34% |
| 50.00% | 50.00% |
| 43.75% | 37.66% |
| 37.50% | 26.25% |
| 31.25% | 16.55% |
| 25.00% | 9.09% |
| 0.00% | 0.00% |

FIG. 18

PROTECTION CIRCUIT FOR LIMITING OPERATING POWER OF ELECTRICAL DEVICE AND METHOD THEREOF

The present invention relates to a protection circuit for limiting the operating power of an electrical device and, in particular but not exclusively, to lighting devices.

BACKGROUND OF THE INVENTION

To protect the environment, people worldwide are becoming increasingly cautious and have generally accepted that the use of fossil fuels should be minimized, and in particular electricity from the mains/household power.

Lighting is one area where energy saving can readily be achieved by the general public. For example, light bulbs of relatively lower power ratings are recommended for general lighting purposes for which lighting intensity is often not critical. In certain jurisdictions, regulations have been made for constraining the operation of lighting apparatus, etc. to below a specific wattage rating, e.g. 190 W for light kits on ceiling fans.

However, due to negligence or lightheartedness, some people may still use over-power light bulbs for brighter illumination, and this will cause unnecessary wastage of energy and can be dangerous.

The invention seeks to eliminate or at least to mitigate such a problem or shortcoming by providing a new or otherwise improved protection circuit for limiting the operating power of an electrical device and method thereof.

SUMMARY OF THE INVENTION

According to a first aspect of the invention, there is provided a protection circuit for limiting operating power of an electrical device in a circuit connected to an electrical power source below a predetermined power rating, the protection circuit comprising:
  a switching device for use in connection with the electrical device for adjusting electrical power supplied from the power source to the electrical device;
  a sensor for sensing a parameter relating to the operating power of the electrical device; and
  a comparator for comparing the parameter sensed by the sensor to identify an undesirable operating condition in which the electrical device operates at a power exceeding the predetermined power rating and for, in response to identifying such an undesirable operating condition, providing an output signal for controlling the switching device to adjust electrical power supplied to the electrical device to below the predetermined power rating, while maintaining an electrical current flow through the electrical device.

Preferably, the sensor comprises a voltage sensing device for sensing an operating voltage of said electrical device, the operating voltage being said parameter.

More preferably, the voltage sensing device comprises a first resistor for connection in series between said electrical device and said power source, the resistor having one end on the side of said electrical device for sensing of the operating voltage of said electrical device.

Further more preferably, the comparator comprises a voltage comparator having a first input connected via a second resistor to the end of the first resistor to input the operating voltage of said electrical device and a second input connected to the other end of the first resistor on the side of said power source to input the voltage appearing at the other end of the first resistor as a reference for comparison.

Yet further more preferably, the other end of the first resistor is for direct connection to said power source such that the voltage of said power source is taken as the reference.

It is preferred that the sensor comprises a current sensing device having a resistor for connection in series between said electrical device and said power source to sense an operating current of said electrical device, the operating current being said parameter.

It is further preferred that the comparator comprises a voltage comparator having two inputs to which opposite ends of the resistor are connected respectively for comparing the potential difference developed across the resistor by said operating current to identify said undesirable operating condition.

In a preferred embodiment, the switching device comprises a relay arranged to switch between at least two first and second circuits, with the first circuit being for normal connection of said electrical device to said power source, and with the second circuit being for connection of said electrical device to said power source upon identifying of said undesirable condition.

More preferably, the first circuit is of relatively low resistance for normally connecting said electrical device to said power source, and the second circuit is of relatively large resistance for connecting said electrical device to said power source upon identifying of said undesirable condition, thereby reducing electrical power supplied to said electrical device to below the predetermined power rating.

More preferably, the switching device includes a solid state switch for connecting said electrical device to said power source, the solid state switch having a control terminal switchable by the relay between the first and the second circuits of different resistances to control duty cycle of conduction of the solid state switch.

Further more preferably, the solid state switch comprises a triac whose control terminal is controlled by a capacitor charging via one of the first and second circuits as switched in by the relay.

More preferably, the protection circuit includes a latching unit connected between the comparator and the relay for latching said output signal of the comparator to the relay such that the relay will stay activated.

More preferably, the relay comprises an electromagnetic relay having a switch and an electromagnet for operating the switch.

In a preferred embodiment, the switching device comprises a solid state switch for connecting said electrical device to said power source, the solid state switch having a control terminal, and a trigger unit connected to the control terminal for in response to said output signal of the comparator providing a series of timed trigger signals to turn on the solid state switch at progressively different firing angles, each over a predetermined time interval, thereby controlling duty cycle of conduction of the solid state switch.

More preferably, the protection circuit includes a controller connected between the comparator and the trigger unit for controlling the timing and firing angle of the trigger signals of the trigger unit.

Further more preferably, the controller comprises a counter for providing a series of control signals at said predetermined time intervals to control the timing of the trigger signals provided by the trigger unit.

Yet further more preferably, the trigger unit comprises a capacitor and a plurality of resistance paths connected to the control terminal of the solid state switch, each of the resistance paths being of a different resistance for progressively adjusting charging time of the capacitor and in turn the firing angle of the trigger signals provided by the trigger unit, the resistance paths being alternatively activated by respective control signals of the counter.

Yet yet further more preferably, the counter has a plurality of outputs for outputting respective control signals, and each of the resistance paths comprises a resistor and a solid state switch having a control terminal connected to a respective output of the counter for activation thereby.

Yet further more preferably, the controller includes a timer connected to the trigger unit for progressively adjusting the firing angle of the trigger signals of the trigger unit, in response to each control signal provided by the counter.

Yet yet further more preferably, the counter has at least one output connected to the timer for outputting the series of control signals to the timer, the control signals being binary signals.

It is preferred that the switching device is arranged to deliver electrical power from said power source to said electrical device initially at maximum power, and subsequently to reduce said electrical power to below the predetermined power rating.

It is preferred that the controller operatively increases the firing angle of the trigger signals of the trigger unit to reduce the duty cycle of conduction of the solid state switch so as to reduce said electrical power to below the predetermined power rating.

It is preferred that the controller operatively reduces the firing angle of the trigger signals of the trigger unit to increase the duty cycle of conduction of the solid state switch so as to increase said electrical power until it exceeds the predetermined power rating, and subsequently increases the firing angle of the trigger signals of the trigger unit to reduce the duty cycle of conduction of the solid state switch so as to reduce said electrical power to below the predetermined power rating.

It is preferred that the predetermined power rating is 190 watts.

According to a second aspect of the invention, there is provided a method of limiting operating power of an electrical device in a circuit connected to an electrical power source below a predetermined power rating, the method comprising the steps of:
(a) providing and connecting a switching device with said electrical device for adjusting electrical power supplied from said power source to said electrical device;
(b) sensing a parameter relating to the operating power of said electrical device;
(c) using the parameter sensed by the sensor to identify an undesirable operating condition in which said electrical device operates at a power exceeding the predetermined power rating; and
(d) in response to identifying such an undesirable operating condition, controlling the switching device to adjust electrical power supplied to said electrical device to below the predetermined power rating, while maintaining an electrical current flow through said electrical device.

Preferably, step (a) includes using a relay as the switching device and arranging the relay to switch between at least two first and second circuits, with the first circuit being for normal connection of said electrical device to said power source, and with the second circuit being for connection of said electrical device to said power source upon identifying of said undesirable condition.

More preferably, step (a) includes providing the first circuit with relatively low resistance for normally connecting said electrical device to said power source, and providing the second circuit with relatively large resistance for connecting said electrical device to said power source upon identifying of said undesirable condition to thereby reduce electrical power supplied to said electrical device to below the predetermined power rating.

More preferably, step (a) includes using a solid state switch as the switching device, the solid state switch having a control terminal, and using the relay to switch between the first and the second circuits of different resistances to control duty cycle of conduction of the solid state switch.

Further more preferably, step (a) includes using a triac having a control terminal as the solid state switch and controlling the control terminal by a capacitor charging via one of the first and second circuits as switched in by the relay.

It is preferred that step (d) comprises controlling the switching device to reduce electrical power supplied to said electrical device to below the predetermined power rating.

BRIEF DESCRIPTION OF DRAWINGS

The invention will now be more particularly described, by way of example only, with reference to the accompanying drawings, in which:

FIGS. 17 and 18 are tables showing the relationship between the duty cycle of the operating voltage of the light kit and the power consumed thereby.

DETAILED DESCRIPTION OF PREFERRED EMBODIMENTS

Figure 1:
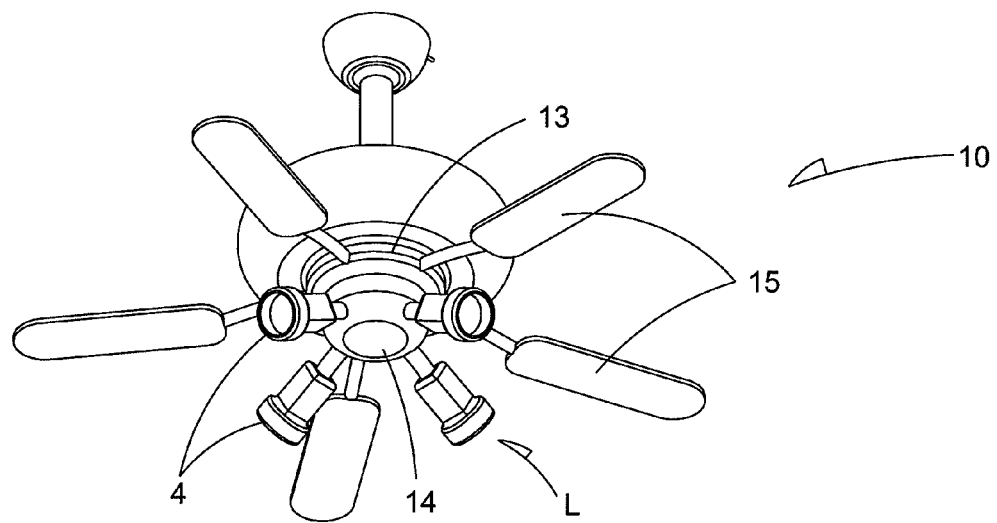
FIG. 1 is a bottom perspective view of an electric ceiling fan including a light kit that incorporates a protection circuit in accordance with the invention.
Figure 3:
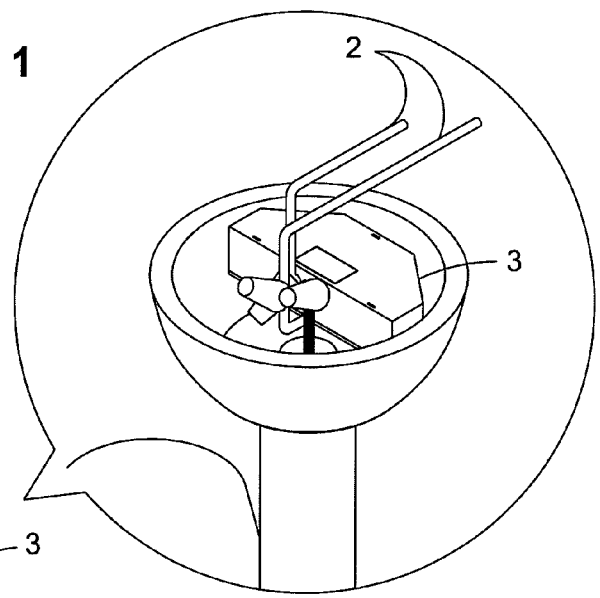
FIG. 3 is an enlarged perspective view of the upper end of the mounting shaft of FIG. 2, showing the case more clearly.
Figure 2:
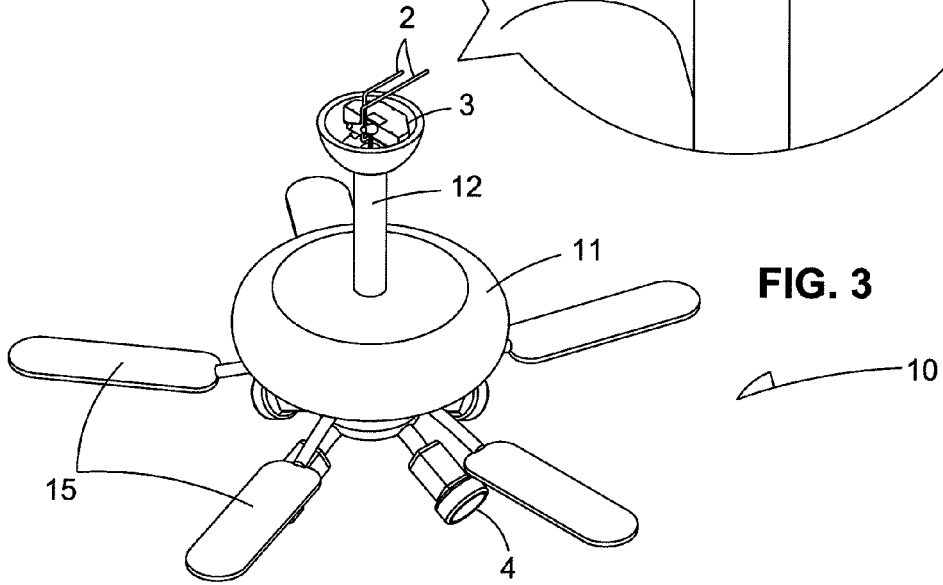
FIG. 2 is a top perspective view of the ceiling fan of FIG. 1, showing the protection circuit which is housed in a case located at an upper end of a mounting shaft of the ceiling fan.
Figure 4:
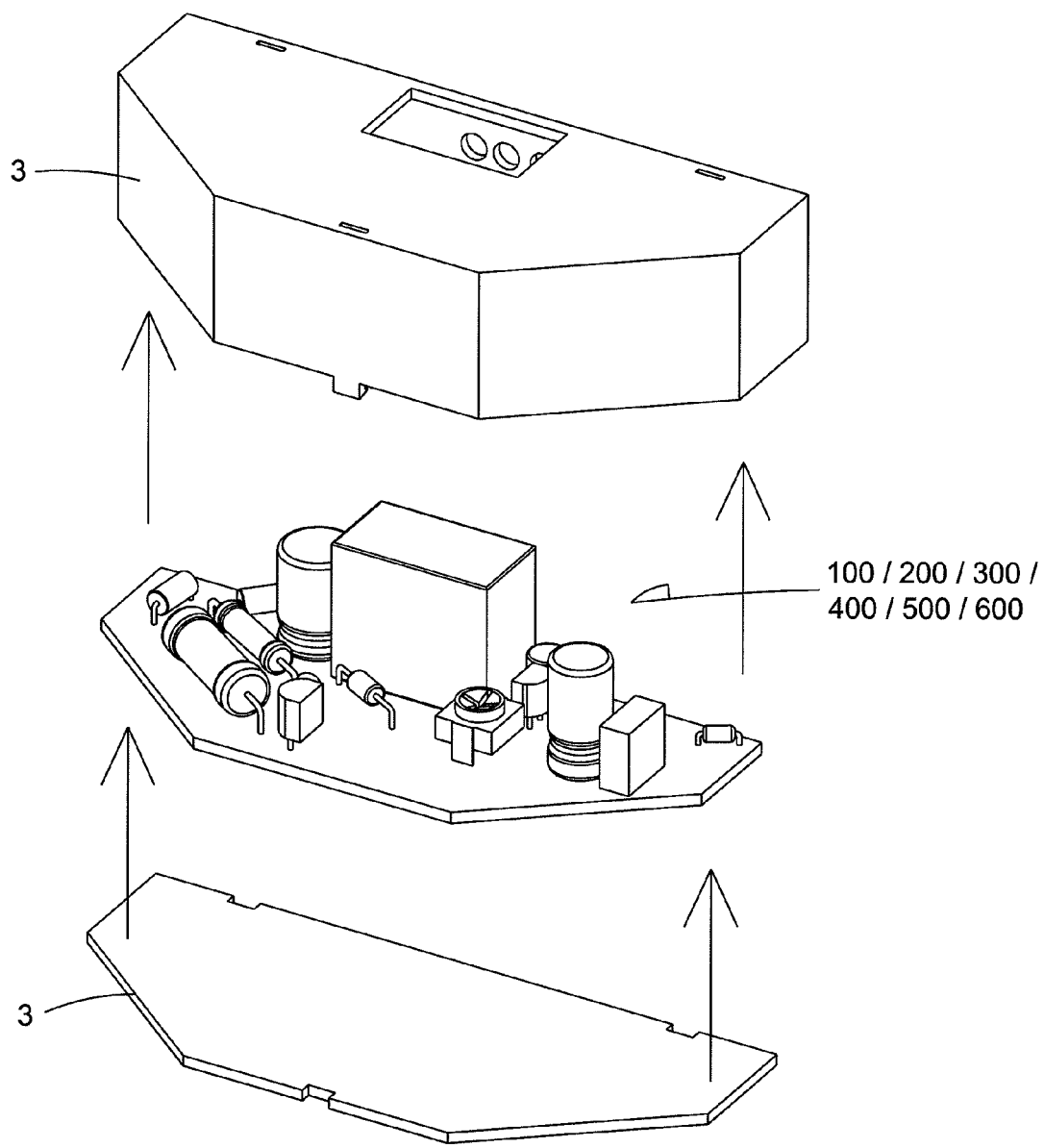
FIG. 4 is an exposed perspective view of the case of FIG. 3, revealing the protection circuit inside.

Referring first to FIGS. 1 to 5 and 7 of the drawings, there is shown an electrical device i.e. electric ceiling fan 10 which incorporates a protection circuit 100 embodying the invention. The ceiling fan 10 is of the typical construction including a motor housing 11 that is suspended from the ceiling by a vertical mounting shaft 12, a fan motor 13 in the housing 11 and driving four or five horizontal fan blades 15, and a switch cup 14 mounted below the motor 13.

The ceiling fan 10 of the type concerned includes at its bottom a light kit L for adding ambient light to the room, which is mounted on the switch cup 14. As is generally known in the art, the light kit L is formed by four (for example) lamp sockets 4 each for holding an incandescent light bulb 5. A pair of electric cables 2 connects the lamp sockets 4 to the mains AC power source M via the subject protection circuit 100 and an ON/OFF switch (not shown) on the switch cup 14 for turning on/off the light kit L.

For environmental protection or safety reasons or to meet certain safety regulations, there is a limit in the power rating or operating wattage for the light kit L, i.e. all the light bulbs 5 together, an overload limit that one should observe. The wattage limit is, for example, 190 W as set by the relevant authority, and this translates into a maximum load current of about 1.65 A for a mains voltage of 115V (110-120V). To meet this requirement, standard 40 W bulbs may be used as the light bulbs 5.

Due to negligence or lighthearted violation, some people may use light bulbs of an excessive wattage (each at e.g. 60 W or even 100 W) for brighter lighting. This is not only a breach of regulations but can indeed be hazardous. The protection circuit 100 serves to automatically restrict the operation of the light kit L to below the aforesaid 190 W wattage rating.

Figure 5:
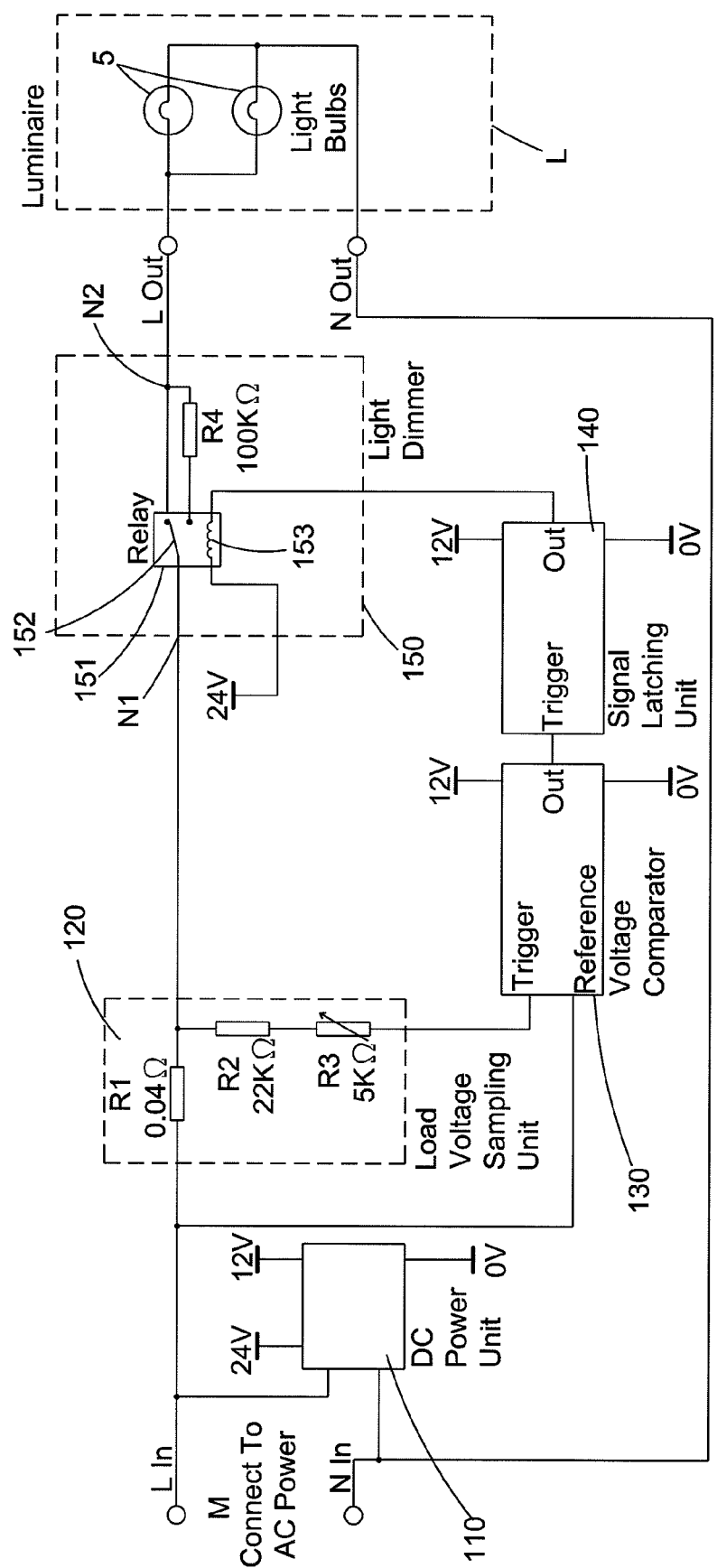
FIG. 5 is a schematic circuit diagram of a first embodiment of the protection circuit of FIG. 4.

In the circuit diagram of FIG. 5, as from the mains power source M to the light kit L, the protection circuit 100 comprises a DC power unit 110, a load voltage sampling unit 120, a voltage comparator 130, a signal latching unit 140 and a light dimmer 150.

The DC power unit 110 is connected across the live and neutral of the mains power source M. It may be implemented by a diode bridge with appropriate filtering capacitors as is generally known in the art, and it provides 24V DC for the light dimmer 150 and 12V DC for the other components, or any other DV voltage(s) as appropriate.

The load voltage sampling circuit 120 samples the load voltage by utilizing a very small resistor R1 (e.g. 0.04Ω) connected in series between the mains live and the load (i.e. the light kit L) as a current sensing device to monitor the load current, and a resistor R2 and variable resistor R3 in series to provide the sampled load voltage.

The potential difference developed across the resistor R1 is dependent upon the load current, which in turn reflects the prevailing operating power of the light kit L.

The load voltage across the light kit L at zero (or near-zero) load current is practically the mains voltage, and the latter is thus used as a reference voltage. By comparing the sampled load voltage with the mains voltage (i.e. the reference voltage) using the voltage comparator 130, the loading condition (i.e. the operating power) of the light kit L can be determined and monitored.

The voltage comparator 130 has a first input connected to the resistor R2/R3 for sampling the load voltage and a second input connected to the mains live for obtaining the reference mains voltage. By comparing the load voltage with the mains voltage, the voltage comparator 130 continuously monitors the operating power of the light kit L.

The voltage comparator 130 is tuned by adjusting the variable resistor R3 such that it will provide a high output signal (e.g. rising from logic low to logic high like the rising edge of a pulse signal) immediately upon the load current exceeding the limit of 1.65 A (i.e. the light kit L operating at a power above the limit of 190 W), for as long as such a condition prevails. This is an undesirable condition in which the light bulbs 5 draw too large a load current (because of their excessive wattage), whereupon the light dimmer 150 is tripped to mitigate possible dangers.

Looking at the current sensing resistor R1 specifically, its opposite ends are connected to the two inputs of the voltage comparator 230 respectively, whereby the comparator 230 compares the potential difference developed across the resistor R1 by the load current to monitor and identify the undesirable over-power operating condition by reference to current as the parameter for consideration.

The light dimmer 150 is implemented by a relay 151 and a resistor R4. The relay 151 is of the electromagnetic type, though it can be of the solid state type. It has a SPDT (single-pole double-throw) switch 152 which is connected in series with the resistor R4 across two circuit nodes N1 and N2 in the live circuit between the load voltage sampling unit 120 and the light kit L. The switch 152 is operated by an electromagnet 153 of the relay 150 for, in a normal position, shorting the circuit between the light kit L and the mains power source M and, in a tripped position, inserting the resistor R4 into the said circuit.

The signal latching unit 140 has an output connected to the electromagnet 153 for passing onto it a said output signal of the voltage comparator 130 so as to toggle the switch 152 into the tripped position. Such a switching action will be performed almost immediately upon the voltage comparator 130 detecting the light kit L operating at a power level exceeding 190 W.

In the tripped position of the switch 152 in comparison with its normal condition, the electrical current through the light kit L is considerably restricted by the resistor R4 connected in series, whereby the light bulbs 5 can only run at a much reduced power level below 190 W.

The signal latching unit 140 serves to latch and hold the comparator's output signal once it appears, and this ensures that the relay 151 will stay activated and in turn the light dimmer 150 and hence the overall protection circuit 100 will stay tripped once it has been tripped, even after the load current has been considerably reduced.

User actions should be taken afterwards, i.e. replacing the light bulbs 5 with lower power ones and then re-switching on the power to the light kit L, whereupon the protection circuit 100 will be reset and then allow normal operation of the light kit L below 190 W.

The operation described above is summarized by the flow chart of FIG. 7. From start (step 101) in about 0.5 s after power has been switched on (long enough for the incandescent load inrush current to settle, usually in about 0.3 s), the voltage comparator 130 determines whether the light bulbs 5 are operating at a power above 190 W (step 102). If this is not the situation, no control on the light bulbs 5 is required and exercised and their light intensity remains unchanged (step 103).

In case the operating power exceeds 190 W, the signal latching unit 140 holds a high output signal "ON" from the voltage comparator 130 (step 104), and the light dimmer 150 kicks in and restricts the operating power of the light kit L, thereby lowering the intensity of the light bulbs 5 (step 105).

The light dimmer 150 operates based on resistance. To avoid excessive rise in the temperature of the resistor R4, its resistance should be large enough (e.g. 100 kΩ) to adequately limit the load current. In this embodiment, the load current will be reduced to such a low level that the light bulbs 5, though still running, will emit light that is barely noticeable, especially in a not-too-dark ambiance.

It is worth noting that the light bulbs 5 will not be switched off or disconnected, nor are they intended to be so, at the end of operation of the protection circuit 100. A small, non-zero electrical current flow through the light bulbs 5 will be maintained, for example to provide a light indication that the protection circuit 100 has tripped or the bulbs 5 are of a power rating that is too high.

This situation is less than ideal because the light kit L may seem malfunctioning (i.e. not working at all) in the tripped condition in which the light bulbs 5 appear unlit, though the truth of the matter is that they are merely unfit for use i.e. too high power.

Figure 6:
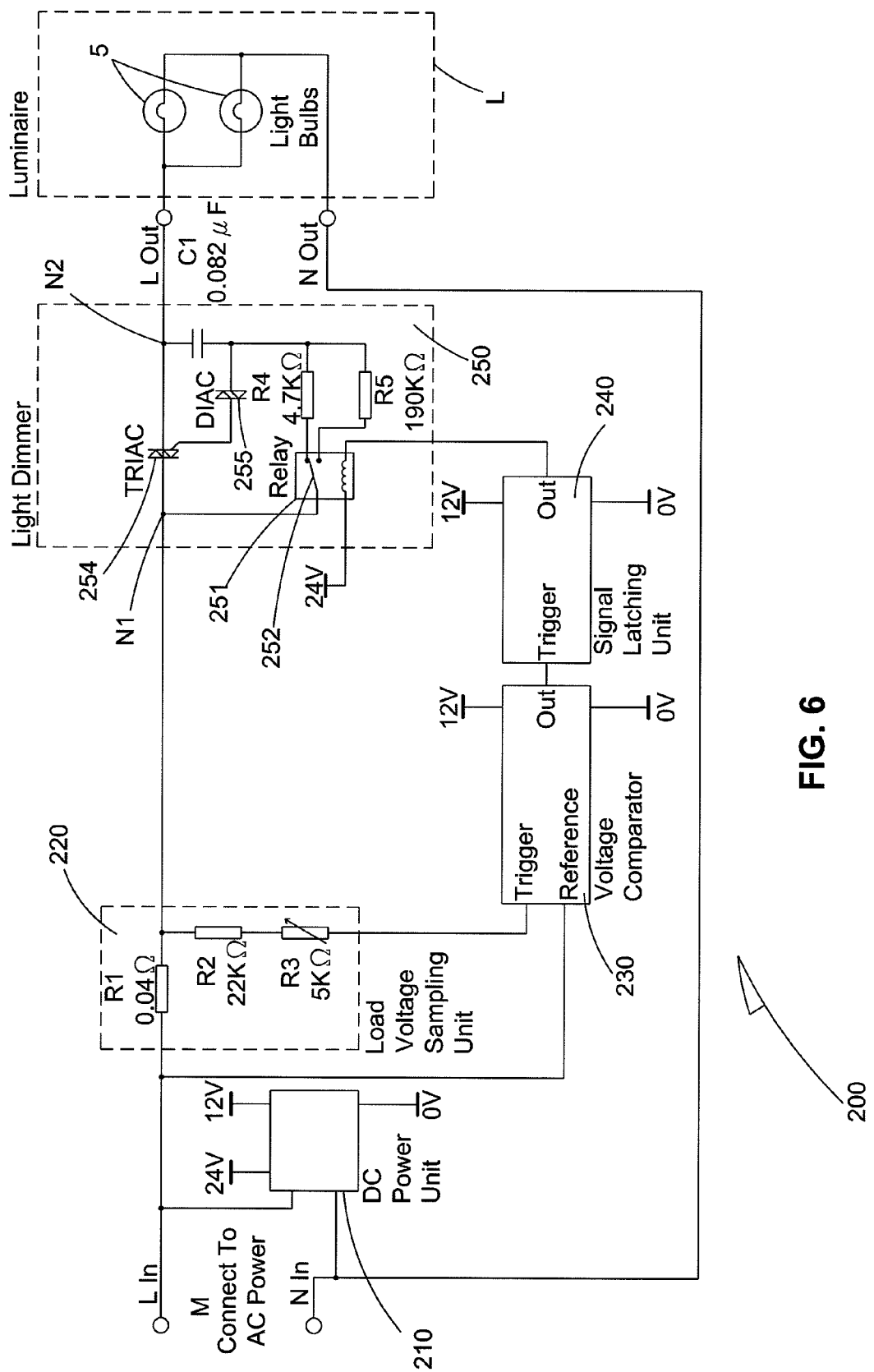
FIG. 6 is a schematic circuit diagram of a second embodiment of the protection circuit of FIG. 4.
Figure 7:
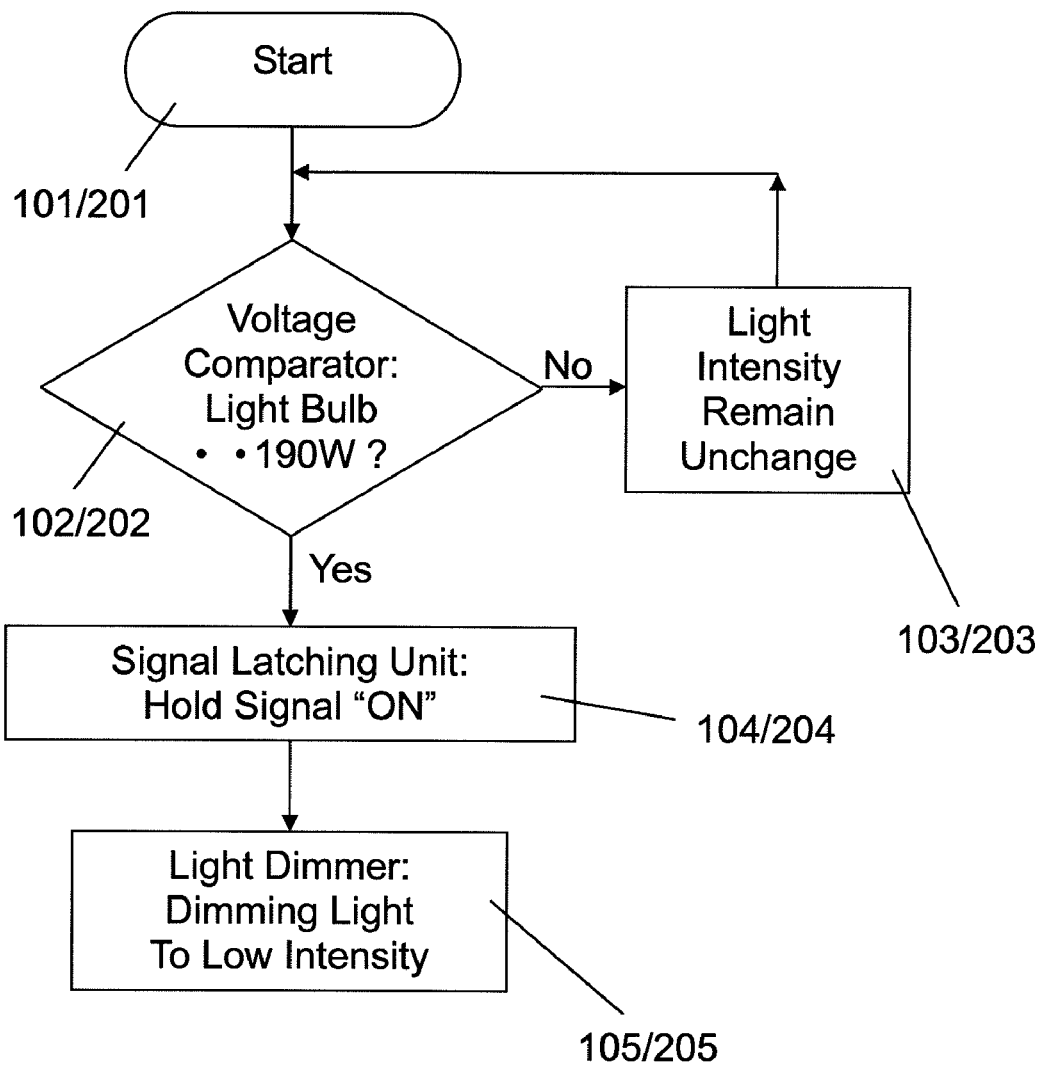
FIG. 7 is a flow chart illustrating the operation of the protection circuits of FIGS. 5 and 6.

A second protection circuit 200 of FIG. 6 embodying the invention is free from such a shortcoming. This protection circuit 200 has a similar circuit design and operation as the first protection circuit 100, with the majority of equivalent components designated by the same reference numerals increased by 100, except for reference signs comprising alphabets that remain the same.

The only major difference lies in the light dimmer 250, which operates based on phase control over the AC power waveform instead of resistance. Apart from the relay 251 and resistor R4 (4.7 kΩ), the light dimmer 250 includes another resistor R5 (190 kΩ), a triac 254, a diac 255 and a capacitor C1. The triac 254 and diac 255 are both solid state switching devices.

The switch 252 of the relay 251 is connected with its COM terminal to the circuit node N1 and with its L1 and L2 terminals to the other circuit node N2 via the two resistors R4 and R5 respectively and then the capacitor C1. The triac 254 is connected across the circuit nodes N1 and N2 (in the live circuit between the load voltage sampling unit 220 and the light kit L), with its gate electrode (i.e. control terminal) connected via the diac 255 and the capacitor C1 to the circuit node N2.

The triac 254 controls by connecting and disconnecting the live circuit between the power source M (via the load voltage sampling unit 220) and the light kit L. It conducts load current in either direction after it has been triggered (turned on) by either a positive or a negative trigger voltage pulse being applied to its gate electrode. Once triggered, the triac 254 will continue to conduct until the current through it drops below a certain threshold value, i.e. at the end of each half cycle of the AC power.

The diac 255 serves to apply the positive/negative trigger pulse to the gate electrode of the triac 254 based on the voltage developed across the capacitor C1. In operation, the capacitor C1 will be charged (for applying the said positive/negative trigger pulse) and then discharge (rapidly via the gate electrode of the triac 254) repeatedly in synchronism with, and during each of, the half cycles of the AC voltage.

The capacitor C1 charges up via either one of the resistors R4 and R5, depending on the switching position of the relay 251. The diac 255 will conduct to apply a trigger or firing pulse upon the capacitor voltage exceeding the diac's breakdown voltage, whereby the triac 254 is turned on to conduct the load current through to the light kit L, until the relevant half cycle of the AC power ends.

It is understood that a triac with a built-in diac at its gate may be employed in place of the triac 254 and diac 255 for simplicity.

In the normal position of the relay switch 252, the resistor R4 is connected (as shown), whose resistance (4.7 kΩ) is sufficiently small for the capacitor C1 to charge up rapidly to the breakdown voltage of the diac 255. This causes the triac 254 to begin conduction almost at start of each half cycle, whereby the triac 254 conducts practically continuously (i.e. at 100% duty cycle of conduction) and the light kit L operates at maximum power.

In case the light bulbs 5 are over-powered and together consume power that exceeds the predetermined limit of 190 W, this will immediately be detected by the voltage comparator 230 based on sampled data from the load voltage sampling unit 220. The voltage comparator 230 will then generate an output signal, maintained by the signal latching unit 240, for the light dimmer 250. Upon the light dimmer 250 being triggered, the relay switch 252 changes to the tripped position thereby switching in or connecting the resistor R5, in replace of the resistor R4, to the capacitor C1.

Because the resistor R5 is of a considerably larger resistance (190 kΩ), the capacitor C1 will take much longer to charge up to the breakdown voltage of the diac 255. This causes the triac 254 to begin conduction with a delay from the start of each half cycle, whereby the triac 254 conducts only over part of the time in each half cycle (e.g. at 25% duty cycle of conduction) and hence the light kit L operates at a reduced power (i.e. 9.09% of the maximum power).

The resistance of the resistor R5 is chosen to give the light kit L a reduced power based on two criteria. First, the reduction in power should be adequate to allow for the highest power light bulbs available on the market that might be used. Second, the light bulbs 5 in question would still appear lit or glow in the normal ambient lighting condition for the use of the light kit L, as a noticeable indication that the light bulbs 5 are unfit (i.e. too high powered) for use and should therefore be replaced.

The operation of the protection circuit 200 described above is summarized in the flow chart of FIG. 7, as discussed in relation to the first protection circuit 100, with equivalent steps designated by the same reference numerals increased by 100 i.e. steps 201 to 205. Description is not repeated here for clarity.

By selecting the resistance of the resistor R5, a firing pulse can be applied at a certain point in each AC cycle (i.e. phase control) of the AC power. This allows one to predetermine the percentage of current that flows via the triac 254 through to the light bulbs 5 in case of an over-power but tripped condition, thereby providing a noticeable dimmed light indication to call for bulb replacement.

However, the user is unable to control or maximize the intensity of the dimmed light indication, for example to suit the prevailing ambient lighting condition. Although it is possible to employ manual means e.g. a variable resistor for the resistor R5, adjustment can be cumbersome to put in place or to use.

Figure 8:
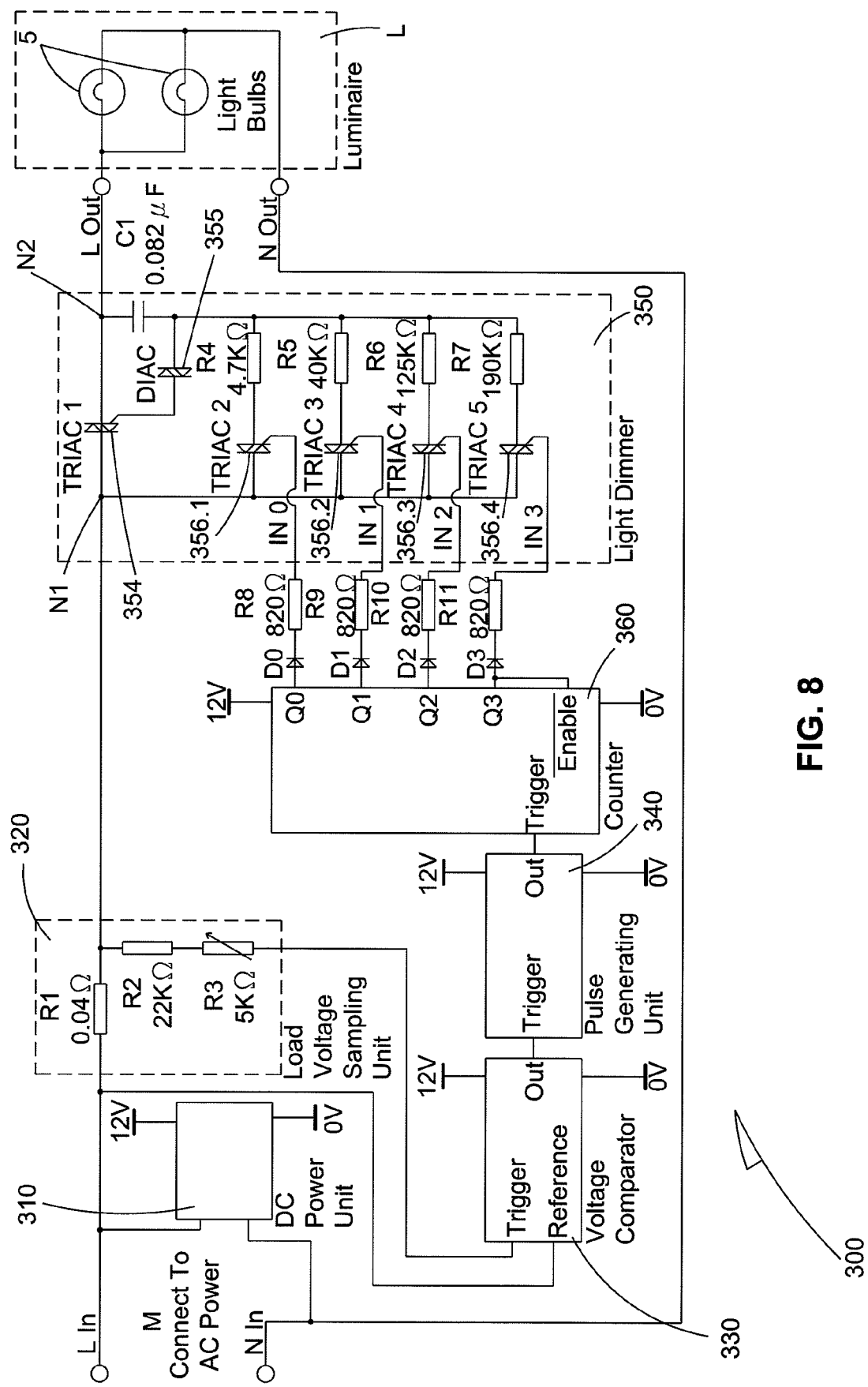
FIG. 8 is a schematic circuit diagram of a third embodiment of the protection circuit of FIG. 4.
Figure 9:
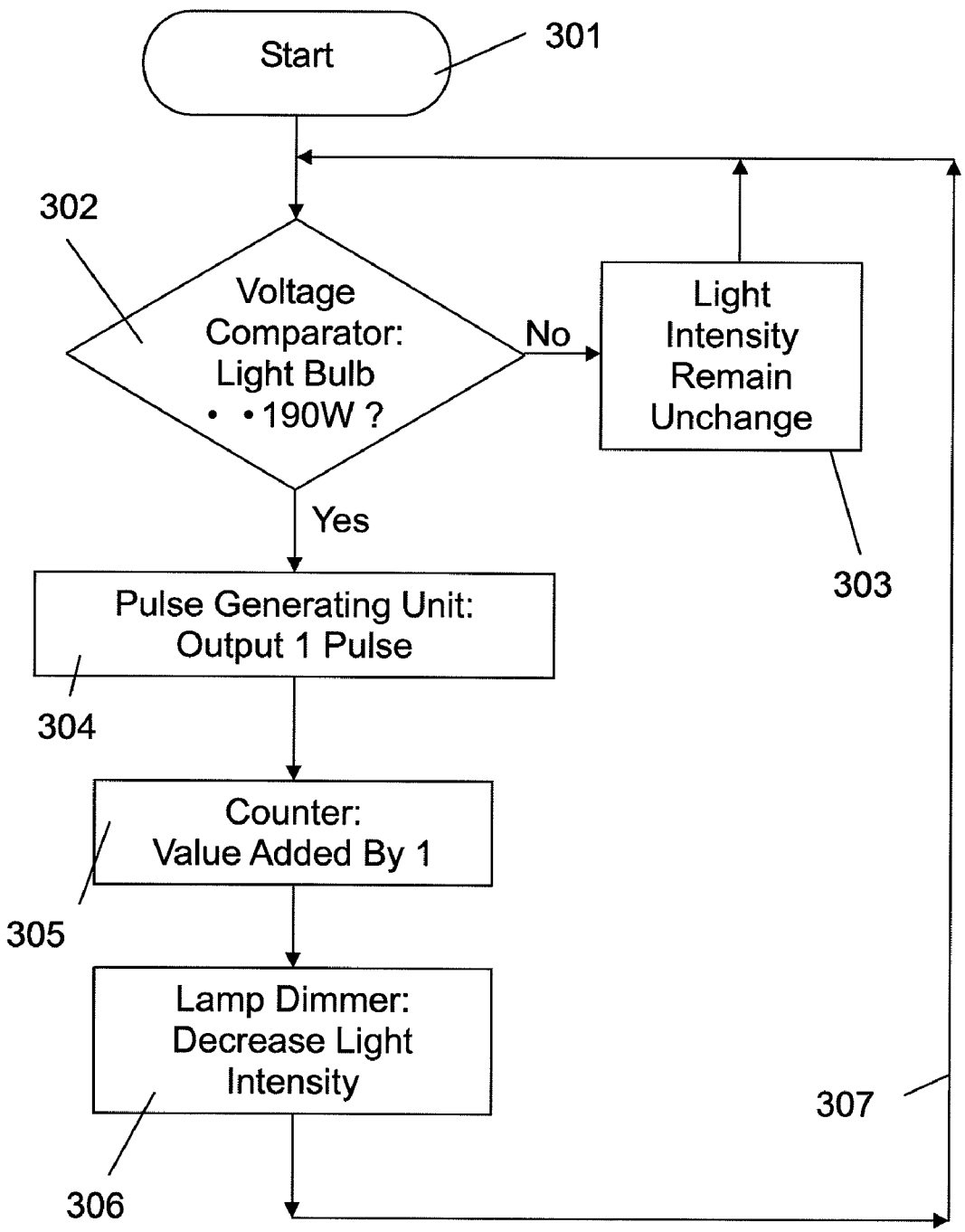
FIG. 9 is a flow chart illustrating the operation of the protection circuit of FIG. 8.

Reference is now made to FIGS. 8 and 9, showing a third protection circuit 300 embodying the invention, in which the intensity of the dimmed light signal for indicating use of over-power light bulbs is self controllable. This protection circuit 300 has a similar design and operation as the second protection circuit 200, with the majority of equivalent components designated by the same reference numerals increased by 100, except for the reference signs comprising alphabets that remain the same.

There are a couple of principal differences. The first difference resides in the light dimmer 350, which although operates likewise based on the principle of phase control it is capable of finer adjustment. The other difference is the use of a counter 360 as a controller that automatically adjusts the light dimmer 350, and this necessitates the use of a pulse generating unit 340 in place of the aforesaid signal latching unit for pulse triggering, in succession if appropriate, the counter 360 in a timed manner.

The light dimmer 350 includes similar triac 354, diac 355 and capacitor C1, likewise connected in the same way relative to the circuit nodes N1 and N2 as the second embodiment 200. The previous relay and associated resistors are replaced by four triacs 356.1 to 356.4 (collectively 356) with respective resistors R4 to R7 connected in series. The triacs 356 with respective resistors R4 to R7 are connected in parallel from the mains live to the capacitor C1 to provide four different resistance paths which are selectable as alternatives for the charging of the capacitor C1 (to the breakdown voltage of the diac 355).

Each of these four resistance paths is controlled by means of the gate electrode of the corresponding triac 356, and the four gate electrodes act as separate control inputs IN0 to IN3 of the light dimmer 350. By applying an appropriate pulse signal at one of the control inputs, the corresponding triac 356 will be turned on to render the associated path conductive, thereby switching in the relevant resistor R4/R5/R6/R7 to allow the capacitor C1 to charge up via that resistor.

The time it will take for the capacitor C1 to charge up during each half cycle of the AC power to the breakdown voltage of the diac 355 is dependent upon the resistance (i.e. 4.7 k$\Omega$/40 k$\Omega$/125 k$\Omega$/190 k$\Omega$) of the resistor R4/R5/R6/R7 that is connected for capacitor charging. Upon breakdown of the diac 355, the capacitor C1 applies a firing pulse to the triac 354 to turn on the same.

Thus, by switching the resistors successively from R4 to R7, the capacitor C1 will take a progressively longer period of time to charge up to cause breakdown of the diac 355 during each half cycle of the AC power, thereby providing corresponding timed firing pulses for the triac 354. The triac 354 will then be conducting for a complementary progressively shorter period of time over each half cycle of the AC power, whereby the light lit L will consume less power and its intensity reduced accordingly.

The shortening periods of time in each half cycle of the AC power during which the triac 354 conducts are illustrated in FIGS. 16A, 16E, 16I and 16M, from 100%, 75%, 50% to 25% duty cycle of conduction, with relationship between such duty cycles and the power consumption listed in FIG. 17.

The counter 360 may be an IC decade counter chip which has a trigger input (i.e. clock pin) and four outputs Q0 to Q3 (i.e. first four of ten output pins being used). By having its outputs Q0 to Q3 connected to the inputs IN0 to IN3 of the light dimmer 350 respectively, each via a respective series circuit of a diode D0/D1/D2/D3 and a resistor R8/R9/R10/R11 (820$\Omega$), the counter 360 controls the triacs 356.1 to 356.4 and hence corresponding $1^{st}$ to $4^{th}$ resistance paths for the charging of the capacitor C1.

The counter 360 is designed, each time upon receiving a trigger pulse at its trigger input, to shift logic high from one of its outputs Q0 to Q3 to the next, i.e. counting. Such a counting operation will start with the first output Q0 (i.e. the initial state) to the second output Q1, then to the third output Q2 and finally to the fourth output Q3, whereupon counting will be terminated, e.g. further counting disabled, by means of a disable pin (negation of enable as shown in FIG. 8) of the counter chip.

The pulse generating unit 340 is configured to provide a series of the aforesaid trigger pulses to the counter 360, at predetermined regular time intervals each of half a second (0.5 s), upon or while receiving an output signal from the voltage comparator 330 detecting that the light kit L consumes more than 190 W power, for as long as such an operating condition persists.

As explained earlier, this occurs immediately when the voltage comparator 330 determines, based on the load current/voltage detected by the sampling unit 320, that the light kit L operates at a power level above 190 W or draws a current larger than 1.65 A. If such an overload condition persists, the pulse generating unit 340 will provide a further trigger pulse every subsequent half-a-second time interval until the overload condition is rectified.

At the outset, the counter's first output Q0 is at logic high and this activates or turns on the first triac 356.1 (i.e. the $1^{st}$ resistance path) to switch in the resistor R4 (4.7 k$\Omega$) for rapid charging up of the capacitor C1 to the breakdown voltage of the diac 355. This causes the triac 354 to begin conduction almost at start of each half cycle, whereby the triac 354 conducts practically at 100% duty cycle of the AC power (FIG. 16A) and the light kit L operates at maximum power.

In the event that the light bulbs 5 are too powerful and draw excessive current (larger than 1.65 A) or power (higher than 190 W), this is detected by the voltage comparator 330, which in turn triggers the pulse generating unit 340 to provide a first trigger pulse for the counter 360 to adjust the light dimmer 350. The counter 360 advances one count and shifts the logic high from its first output Q0 to its second output Q1, thereby turning on the second triac 356.2 of the light dimmer 350 (i.e. the $2^{nd}$ resistance path) instead to switch in the resistor R5 (40 k$\Omega$) for slower charging of the capacitor C1. This causes the triac 354 to start conduction with a delay of 25% of the time over each half cycle, whereby the triac 354 conducts at 75% duty cycle of the AC power (FIG. 16E), and the light kit L operates at a lower power reduced by one step (i.e. 90.92% of the maximum power).

The voltage comparator 330 continuously monitors the load voltage/current. If the load current still exceeds 1.65 A, the pulse generating unit 340 will generate a second trigger pulse for the counter 360 half a second after the first. The counter 360 then advances another one count and shifts the logic high to its third output Q2, thereby activating the third triac 356.3 (i.e. the $3^{rd}$ resistance path) to switch in the resistor R6 (125 k$\Omega$) for further slower charging up of the capacitor C1. This causes the triac 354 to begin conduction with a delay of 50% of the time over each half cycle, whereby the triac 354 conducts at only 50% duty cycle of the AC power (FIG. 16I) and the light kit L consumes 50% of the maximum power, at a power reduced by another step.

The aforesaid operations will be repeated once more, for the last time, a further 0.5 s later if the load current still exceeds 1.65 A. Thus, the counter 360 will shift the logic high to its fourth output Q3 to turn on the fourth triac 356.4 (i.e. the $4^{th}$ resistance path), thereby switching in the largest resistor R7 (190 k$\Omega$) to further slow down charging of the capacitor C1. The triac 354 will begin conduction with a delay of 75% of the time over each half cycle, such that the triac 354 will conduct at only 25% duty cycle of the AC power (FIG. 16M) and the light kit L operates at minimum power (i.e. reduced by yet another step to 9.09% of the maximum power).

Overall, the light dimmer 350 will gradually reduce the intensity of the light bulbs 5 in steps, every half a second. Depending on the original power rating of the light bulbs 5, the load current may drop below the 1.65 A limit after the counter 360 has advanced only once (current reduced to 75% duty cycle), or twice (to 50% duty cycle), without the need for the current to further reduce down to 25% duty cycle.

Under the control of the counter 360 the light dimmer 350 gradually kicks in to reduce the load current in steps, and the interim load condition is then analyzed to determine if a further operation of the light dimmer 350 is required. This is done to avoid unnecessarily over reducing the load current after the protection circuit 300 has tripped, with a view to ensuring that the dimmed light of the light bulbs 5 will be noticeable (i.e. sufficiently lit or glowing) as a signal calling for bulb replacement.

The operation described above is summarized by the flow chart of FIG. 9. From start (step 301) in about 0.5 s after power has been switched on (long enough for incandescent load inrush current to settle, usually in about 0.3 s), the voltage comparator 330 determines whether the light bulbs 5 are operating at a power above 190 W (step 302). If this is not the situation, no control on the light bulbs 5 is required and their light intensity remains unchanged (step 303). In case the operating power exceeds 190 W, the pulse generating unit 340 outputs a trigger pulse (step 304) for the counter 360, which thus advances one count or adds one to a stored value (step 305). The light dimmer 350 then kicks in and reduces the light intensity (step 306) by shortening the duty cycle of the AC power by 25%. The operation will subsequently loop back (via path 307) and be repeated from start (step 301) to check whether the operating power still exceeds 190 W (step 302), and so forth. One or more loops may be necessary to bring the operating power down below 190 W.

To maximize the load current after the protection circuit has tripped for a brightest possible dimmed light signal calling for bulb replacement, a more delicate circuit and control are required.

Figure 10:
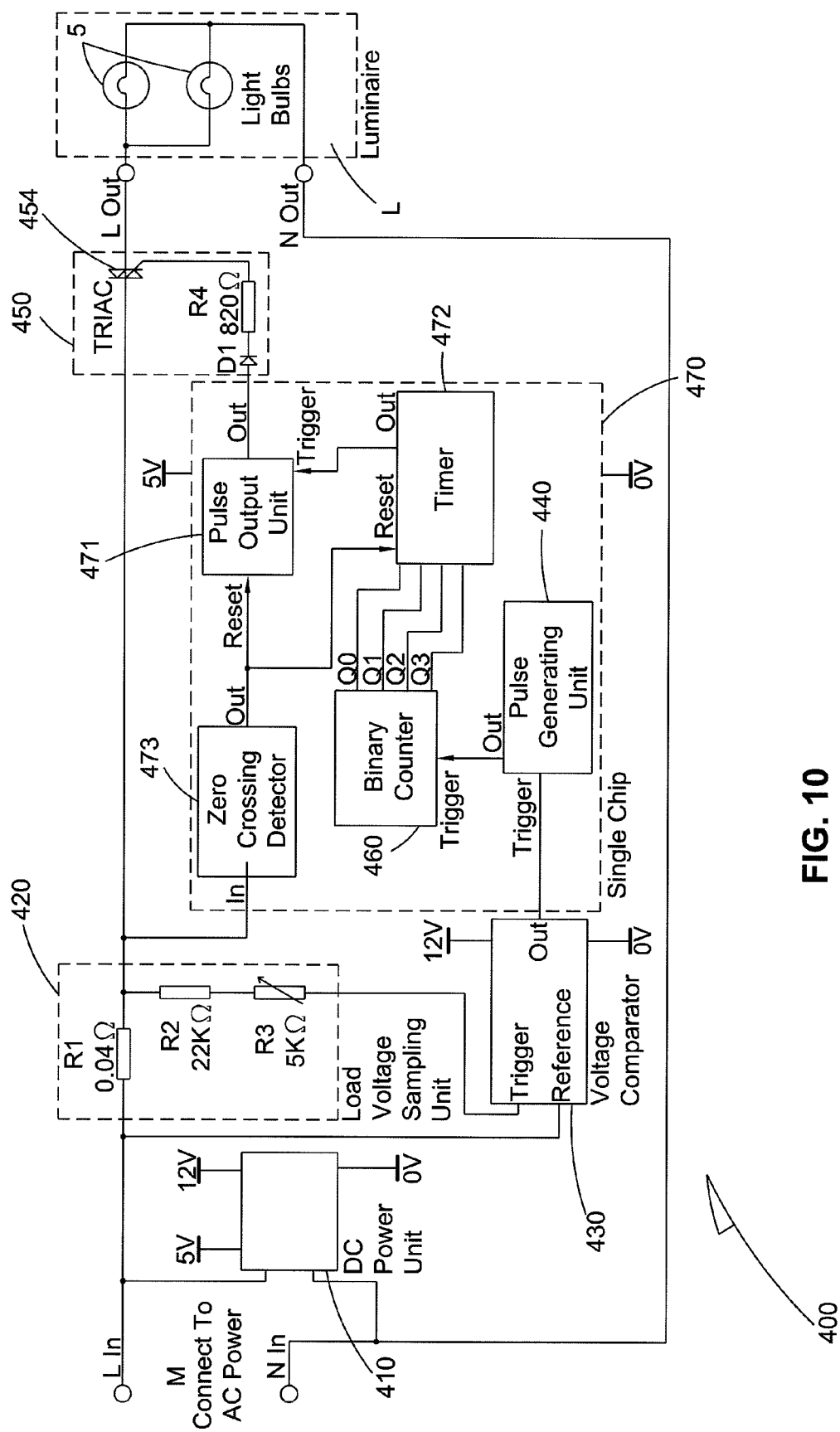
FIG. 10 is a schematic circuit diagram of a fourth embodiment of the protection circuit of FIG. 4.
Figure 11:
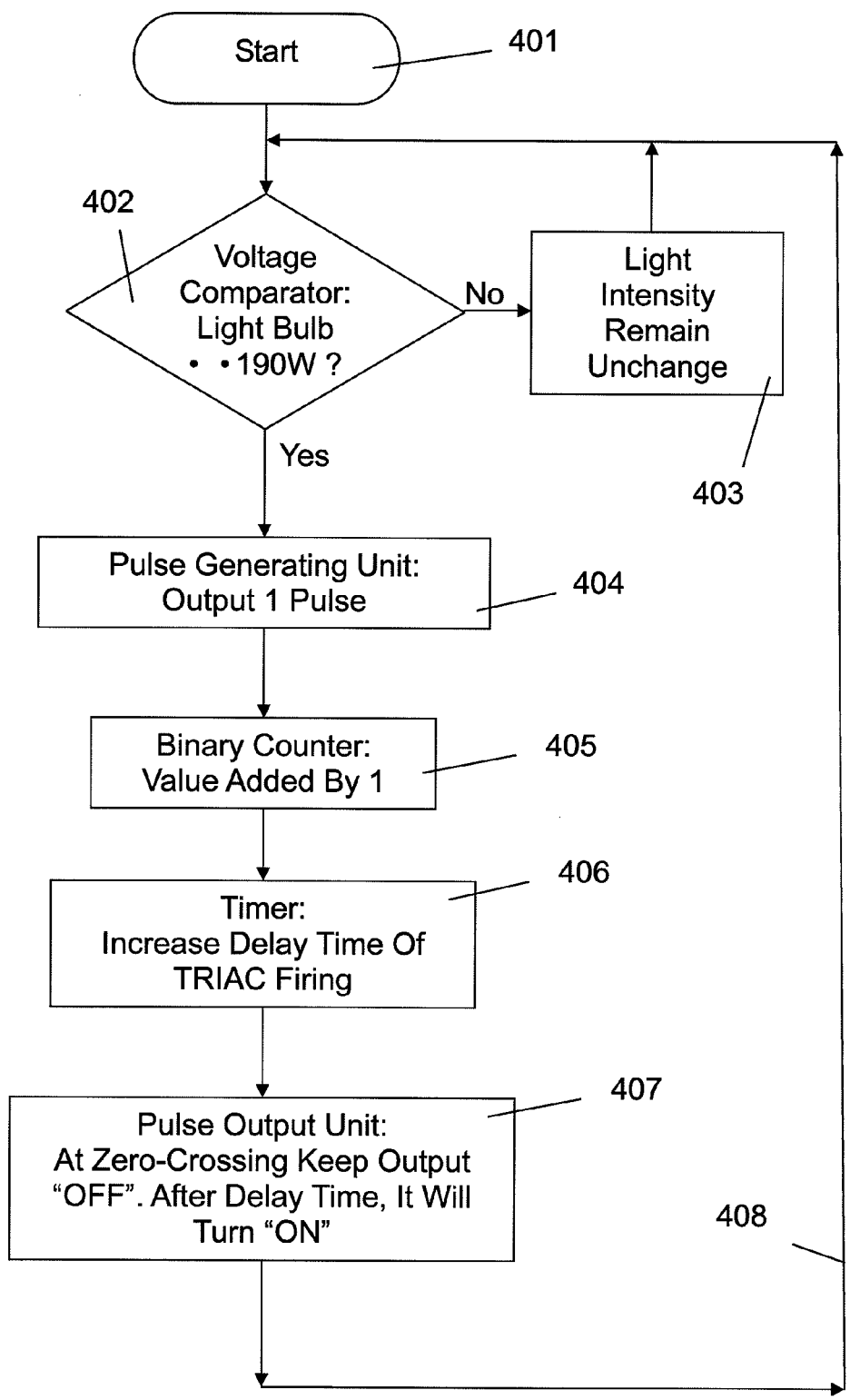
FIG. 11 is a flow chart illustrating the operation of the protection circuit of FIG. 10.

Reference is now made to FIGS. 10 and 11, showing a fourth protection circuit 400 embodying the invention, in which the intensity of the dimmed light signal to indicate use of over-power light bulbs can be maximized. This protection circuit 400 has a similar design and operation as the third protection circuit 300, with the majority of equivalent components designated by the same reference numerals increased by 100, except for the reference signs comprising alphabets that remain the same.

Although the operation of the light dimmer 450 is also based on the principle of phase control over the conduction of triac 454, the phase control in this embodiment does not rely on the charging/discharging of a capacitor in an analogue manner, but instead it is performed digitally by means of a single IC (integrated circuit) controller chip 470.

The light dimmer 450 is implemented by the triac 454, whose gate electrode is connected to the output of the controller chip 470 via diode D1 and resistor R4 for direct control by the controller chip 470. The triac 454 connects and applies the mains live appearing downstream of the load voltage sampling unit 420 to the light kit K, with phase control over the applied load voltage.

The controller chip 470 is fabricated to include the pulse generating unit 440 and the counter 460, both of which find equivalent counterparts in the third protection circuit 300 though the earlier ones are discrete components. The pulse generating unit 440 similarly, upon detection by the voltage comparator 430 that the light kit L consumes more than 190 W power or draws a current larger than 1.65 A (i.e. an overload condition), provides a series of trigger pulses for the counter 460 at predetermined regular time intervals (i.e. 0.1 s), for as long as such an operating condition persists. The time intervals in this case are however much shorter i.e. 0.1 s, as digital components act a lot faster than analogue ones. The counter 460 is a binary counter having four output pins Q0 to Q3.

The controller chip 470 further includes a pulse output unit 471 at its output for providing firing pulses to turn on the triac 454, and a timer 472 connected to the pulse output unit 471 for determining the precise moment when each firing pulse from zero crossing is outputted. Also included is a zero crossing detector 473 for resetting the pulse output unit 471 and the timer 472. The zero crossing detector 473 has an input connected to the mains live for detecting zero crossings in the live/load voltage (i.e. start of every half cycle) and, in response, outputting a reset signal to reset both the pulse output unit 471 and the timer 472 at each zero crossing.

The binary counter 460 is programmed to advance one count and output the resultant count at its output pins Q0 to Q3, each time when it receives a trigger pulse from the pulse generating unit 440, i.e. every 0.1 s since detection of an overload condition.

The control signal is a four-digit binary number with a value ranging from "0000" (i.e. the initial state) to "1111". There are sixteen possible values in total, each representing a respective firing angle in each half cycle (180°) of the AC power, at which the triac 454 should be turned on under the control of the controller chip 470 to deliver a corresponding level of power.

The timer 472 determines the firing angle according to the control signal (i.e. its value) by computing the delay in time from zero crossing in each half cycle (180°) of the AC power when a firing pulse is to be issued to turn on the triac 454. The firing angles are arranged sequentially at regular intervals apart, progressively increasing from 0° (i.e. the initial state at maximum power), 11.25°, 22.5°, . . . , 112.5°, 123.75°0 to 135° (see FIGS. 16A to 16M), in steps of 11.25°. The incremental steps are constant i.e. 11.25°, and this is equivalent to 6.25% in the duty cycle of the AC power.

Taking 60 Hz as the utility/mains frequency for example, the period of each cycle (360°) of the AC power is 1/60 second. Each step of 11.25° in the phase angle thus occupies a time interval of 0.5208 ms (millisecond), which is to be adopted as one unit of delay in time from zero crossing (multiple units anticipated) before issuing a thus timed firing angle for the triac 454.

In this embodiment, the largest firing angle intended for use is 135° as this corresponds to a 25% duty cycle of the AC power, which represents a power reduction to 9.09% and this is already sufficiently low to allow for use of highest possible power light bulbs in the light kit L. Thus, only the first thirteen firing angles are being made use of.

In the default initial state, the binary counter 460 presents "0000" as the control signal that calls for a firing angle of 0°, at which the pulse output unit 471 issues a firing pulse to turn on the triac 454 of the light dimmer 450 almost at zero crossing i.e. start of each half cycle of the AC power. The triac 454 thus conducts practically at 100% duty cycle of the AC power (FIG. 16A), and the light kit L operates at maximum power.

In the event that the light bulbs 5 are too powerful and draw an excessive current (larger than 1.65 A) or power (higher than 190 W), this is detected by the voltage comparator 430, which in turn triggers the pulse generating unit 440 to issue a first trigger pulse for the binary counter 460 to advance one count to "0001". This count represents the next firing angle that is increased by one step from the earlier angle i.e. to i.e. 11.25°, under the timing control of the timer 472. The pulse output unit 471 then turns on the triac 454 at 93.75% (reduced by 6.25%) duty cycle of the AC power (FIG. 16B), and the light kit L operates at a correspondingly reduced power.

If the load current/power remains excessive over (or at the end of) the predetermined 0.1 s time interval, the operation described in the preceding paragraph is repeated. Accordingly, the pulse generating unit 440 issues another trigger pulse for the binary counter 460 to advance another count to "0010". This count represents the next firing angle that is increased by one step from the earlier angle i.e. to 22.5°, again under the timing control of the timer 472. The pulse output unit 471 then turns on the triac 454 at 87.5% (reduced by another 6.25%) duty cycle of the AC power (FIG. 16C), and the light kit L operates at a correspondingly further reduced power.

The operation will be repeated again a further period of 0.1 s later, or every 0.1 s time interval if repeated more than once, until the power consumption of the light kit L reduces down to below 190 W. When the power consumption comes within limit, the protection circuit 400 maintains the prevailing operating condition. More specifically, the voltage comparator 430 issues no further trigger for the controller chip 470, which then continues to operate with no further changes and in particular maintaining the firing angle for the triac 454 to keep the existing duty cycle of the AC power at which the light kit L operates.

The whole process of operation of the protection circuit 400 will be performed each time the light kit L is switched on. The light bulbs 5, upon being switched on, are permitted to lit up to maximum intensity. In about half a second after the power has been switched on (long enough for incandescent load inrush current to settle, usually in about 0.3 s), if the light bulbs 5 draw excessive power/current, they will be dimmed gradually from maximum intensity in one or more steps (each 0.1 s) over a short period of time of say a few tenths of a second (depending on how much the original operating power is in excess), until their power consumption is reduced to within limit. The whole process will usually take no longer than a second or so.

The use of digital means, and the timer 472 and pulse output unit 471 in particular, allows more delicate and much finer and swifter control over the firing angle for the light dimmer 450 and in turn the power consumption (and hence brightness) of the light bulbs 5. Compared with the earlier embodiments, considerably more power levels are available for gradually adjusting the operating power of the light bulbs 5, and at a much faster pace, such that their brightness can be maximized, and in a shorter period of time, when their operating power is brought down to within the limit of 190 W.

At the end of the operation of the protection circuit 400 (in say one to two seconds from switch-on), the light bulbs 5 will be operating at a power not-too-far below the limit of 190 W, such that they would be sufficiently bright for illumination purpose. In this case, there would be no need at all to replace the light bulbs 5. The dimming of the light bulbs 5 immediately following switch-on would be noticeable as a signal that the bulbs 5 are of a power rating that is too high, though the signal can be disregarded because power consumption has automatically been capped and the reduced brightness would still be adequate.

The operation described above is summarized by the flow chart of FIG. 11. From start (step 401) in about 0.5 s after power has been switched on, the voltage comparator 430 determines whether the light bulbs 5 are operating at a power above 190 W (step 402). If this is not the situation, no control on the light bulbs 5 is required and their light intensity remains unchanged (step 403). In case the operating power exceeds 190 W, the pulse generating unit 440 outputs a trigger pulse (step 404) for the counter 460, which thus advances one count or adds one to a stored value (step 405).

The new count causes the timer 472 to add one unit of delay in time (i.e. 0.5208 ms) corresponding to one step of increment in the firing angle (i.e. 11.25°) for the triac 454 of the light dimmer 450 (step 406). Upon detection of each zero crossing in the AC power (i.e. start of each half cycle) by the zero crossing detector 473, the timer 472 runs the total delay in time, at the expiration of which the timer 472 triggers the pulse output unit 471 (step 407) to issue a firing pulse and turn on the triac 454 for conduction over the remainder of the relevant AC power half cycle. The light dimmer 450 thus reduces the intensity of the light bulbs 5 by shortening the duty cycle of the AC power by one step of 6.25%.

The operation will subsequently loop back (step 408) in 0.1 s and be repeated from start (step 401) to check whether the operating power still exceeds 190 W (step 402), and so forth. One or more loops, each over the predetermined time interval of 0.1 s, may be necessary to bring the operating power gradually down to below 190 W.

Because the power and hence intensity of the light bulbs 5 is gradually reduced in finer steps (by increasing the triac firing angle incrementally), the light bulbs 5 will remain sufficiently bright after the operating power (or load current) has been capped. This avoids the need to replace the light bulbs 5.

The whole process of operation of the protection circuit 300/400 will be performed each time the light kit L is switched on. The light bulbs 5 will lit up to maximum intensity upon being switched on. If the light bulbs 5 exceed the designated power limit, they will be dimmed from maximum intensity gradually in one or more steps (each 0.5 s/0.1 s) over a short period from half a second to a couple of seconds at most, until they consume power below the limit.

The two protection circuits 300/400 operate by reducing gradually, from maximum power, the power consumption by the light kit L in steps to bring it down to below the power limit. Conversely, it is possible to adjust (increase) the power consumption gradually from minimum power, as is the case with the fifth and sixth protection circuits 500 and 600 also embodying the invention.

Figure 12:
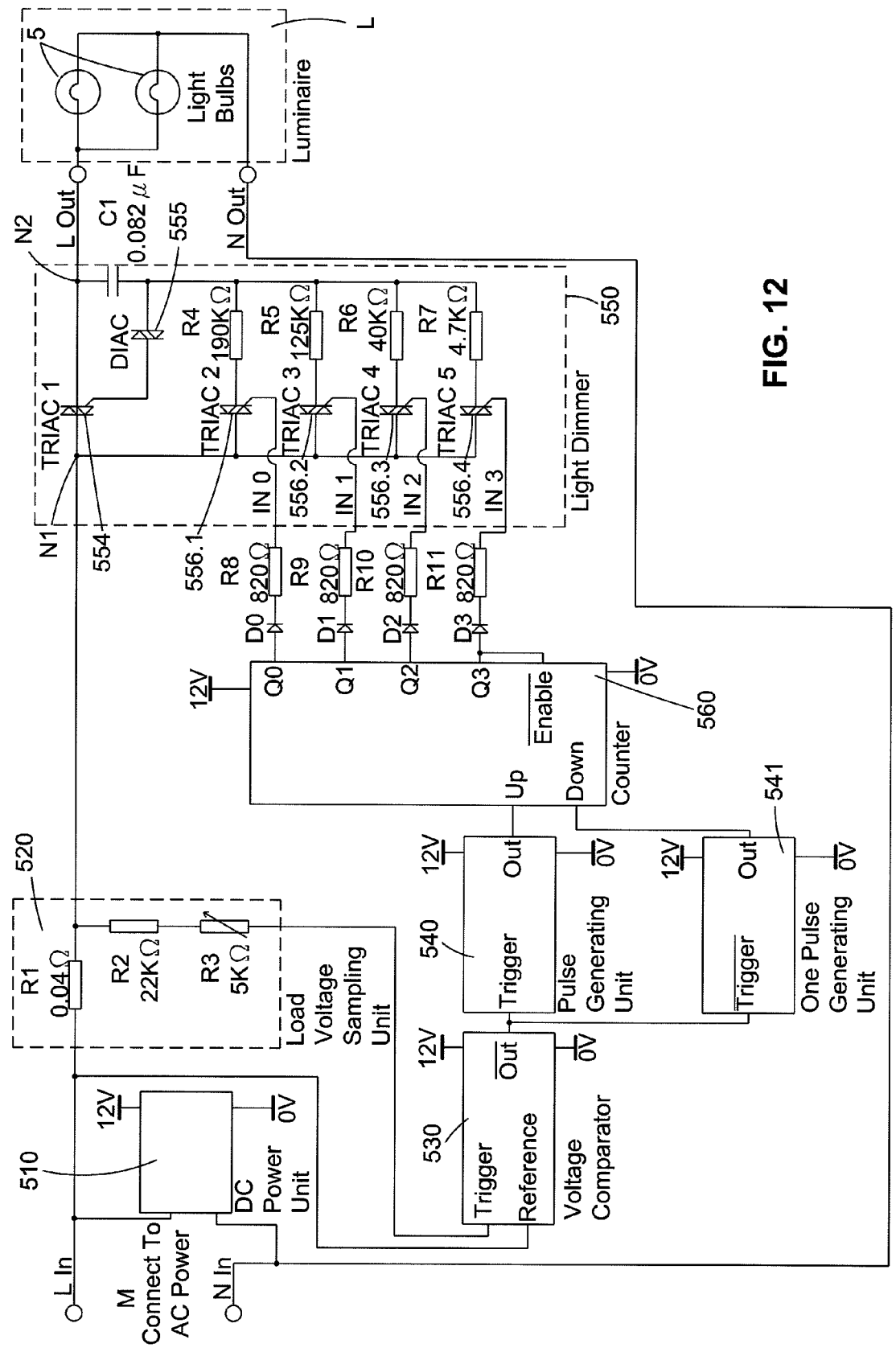
FIG. 12 is a schematic circuit diagram of a fifth embodiment of the protection circuit of FIG. 4.
Figure 13:
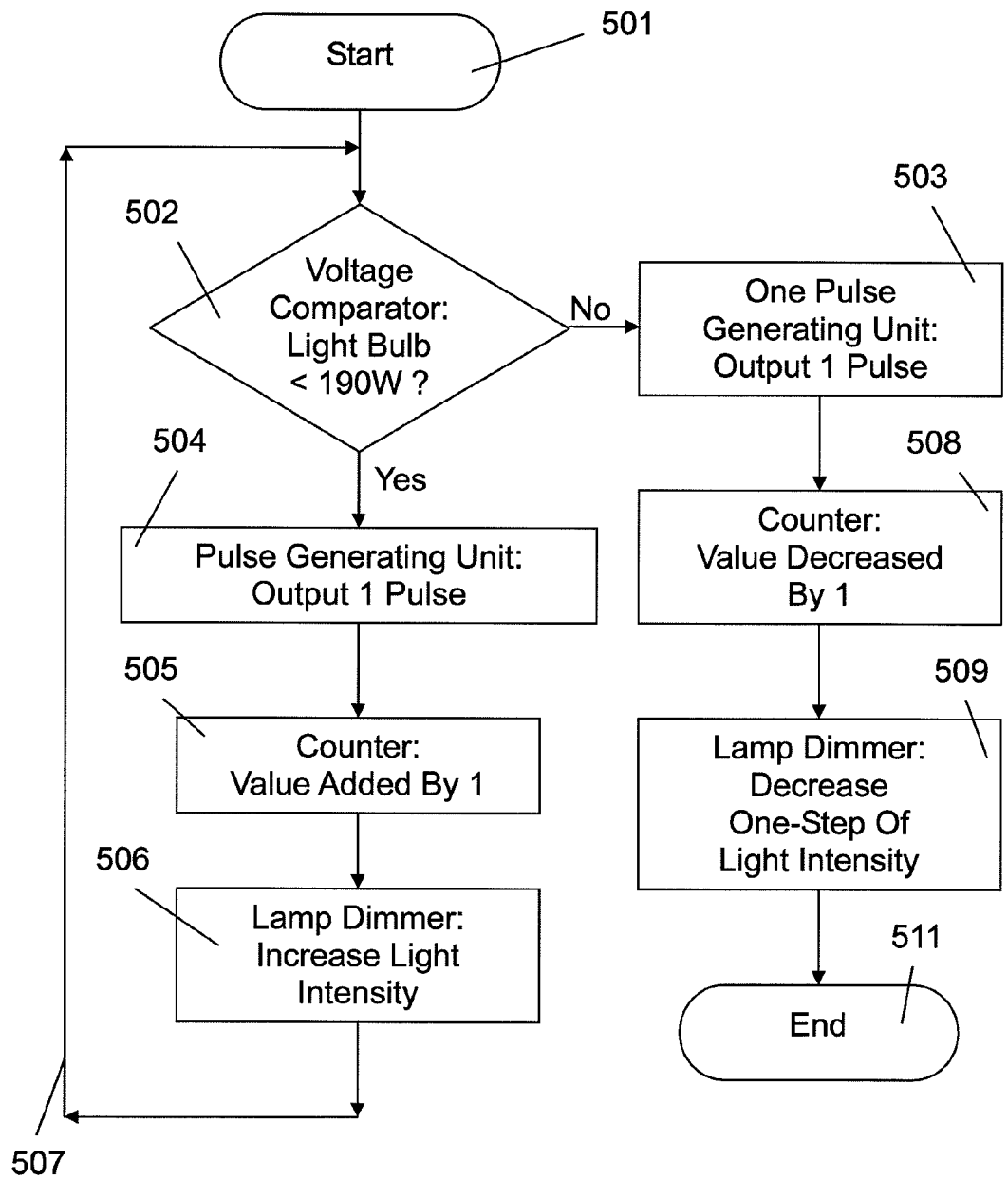
FIG. 13 is a flow chart illustrating the operation of the protection circuit of FIG. 12.

The fifth protection circuit 500 is shown in FIGS. 12 and 13, and it has a similar design similar to that of the third protection circuit 300, with the majority of equivalent components designated by the same reference numerals increased by 200, except for the reference signs comprising alphabets that remain the same.

As one major difference, the protection circuit 500 includes a "one" pulse generating unit 541 which is connected between the voltage comparator 530 and the counter 560, in parallel with the pulse generating unit 540. Both units 540 and 541 are controlled by a common same output of the voltage comparator 530, but the latter operates in a different manner.

The voltage comparator 530 is arranged to provide a reversed, low output signal (i.e. falling from logic high to logic low like the falling edge of a pulse signal) upon detecting the light kit L operating at a power below the limit of 190 W, for as long as such an under-power operating condition prevails. The pulse generating unit 540 is activated in response to such a low output signal.

When the light kit L changes to operate above 190 W, the voltage comparator 530 will then provide a high output signal (i.e. rising from logic low to logic high like the rising edge of a pulse signal). The "one" pulse generating unit 541 is activated in response to such a high output signal.

Another major difference lies in the arrangement of resistances in the four resistance paths of the light dimmer 550, in that the resistors R4, R5, R6 and R7 in the $1^{st}$ to $4^{th}$ resistance paths are arranged to have reducing resistances from 190 kΩ, 125 kΩ, 40 kΩ to 4.7 kΩ respectively. This is directly opposite to the increasing resistance arrangement of the $1^{st}$ to $4^{th}$ resistance paths in the third protection circuit 300.

Upon switch-on of the light kit L, the counter 560 has its first output pin Q0 at logic high (i.e. the initial state) to activate the $1^{st}$ resistance path (including the resistor R4 of 190 kΩ) of the light dimmer 550, whereby the light kit L starts operation at minimum power, i.e. 25% duty cycle of the AC power (step 501). While the light kit L operates below 190 W as detected by the voltage comparator 530 (step 502), the pulse generating unit 540 is activated.

The counter 560 will then count up one count for one time, or for more than one time i.e. repeated every 0.5 s if necessary (step 507), by successively shifting its logic high signal to the next output pin Q1/Q2/Q3 to increase the operating power of the light kit L to 50%/75%/100% duty cycle, thereby progressively increasing its lighting intensity (steps 504 to 506). This operation will stop as soon as the power consumption of the light kit L exceeds 190 W, in case the light bulbs 5 have a power rating that is too high.

Accordingly, the counter 560 starts operation in the same manner as the earlier counterpart under the control of the pulse generating unit 540, but it adjusts (increases) the power consumption gradually from minimum power until the light kit L consumes more than 190 W.

When this occurs (step 502), the "one" pulse generating unit 541 is then activated instead to trigger the counter 560 to count down one count once by shifting its logic high signal one output pin back, to the immediately preceding output pin (steps 503 and 508). The operating power of the light kit L is thus adjusted back (i.e. reduced) by 25% to bring it down to within one step below 190 W, whereby the lighting intensity is reduced by one step (step 509), and the operation finally ends (step 511).

Figure 14:
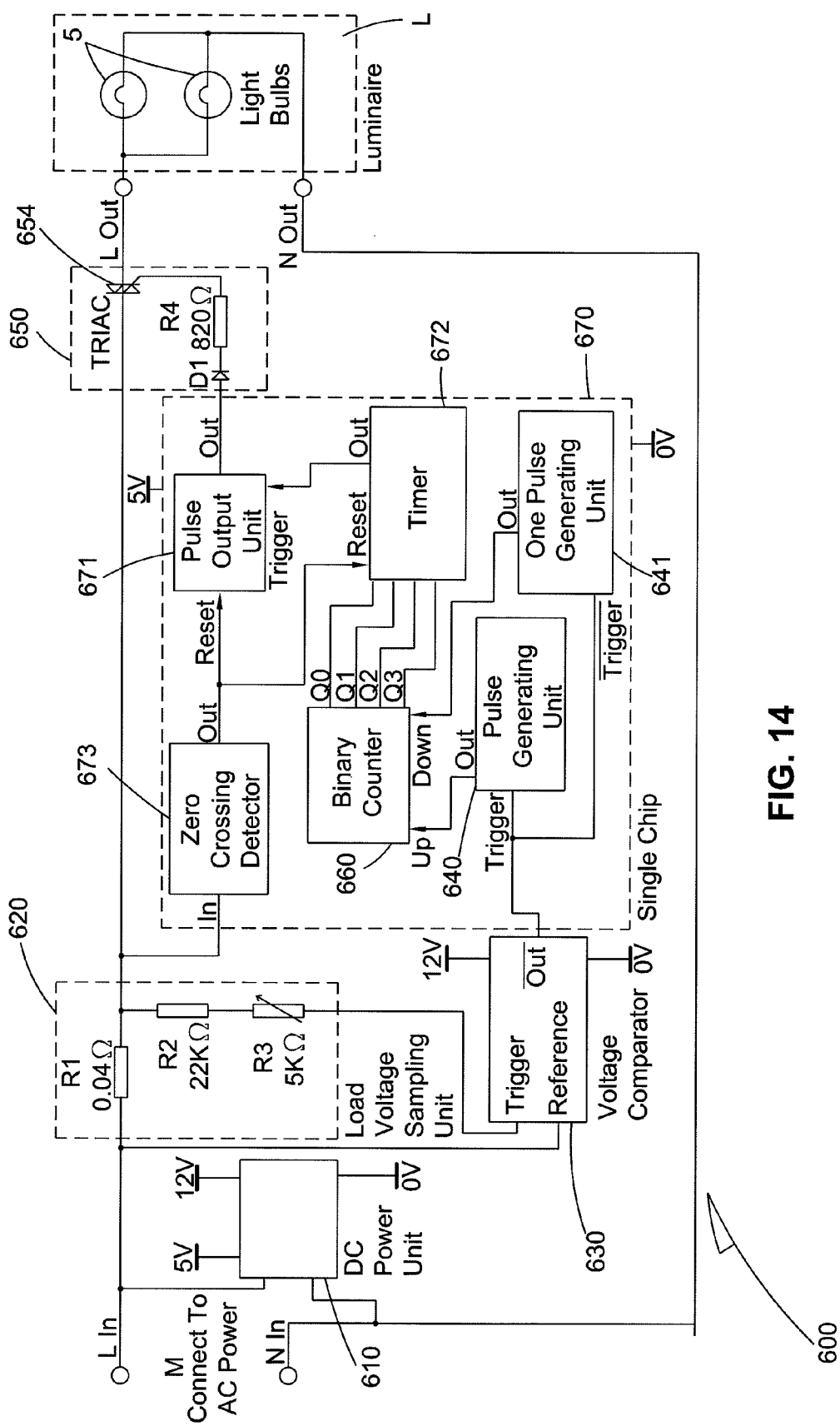
FIG. 14 is a schematic circuit diagram of a sixth embodiment of the protection circuit of FIG. 4.
Figure 15:
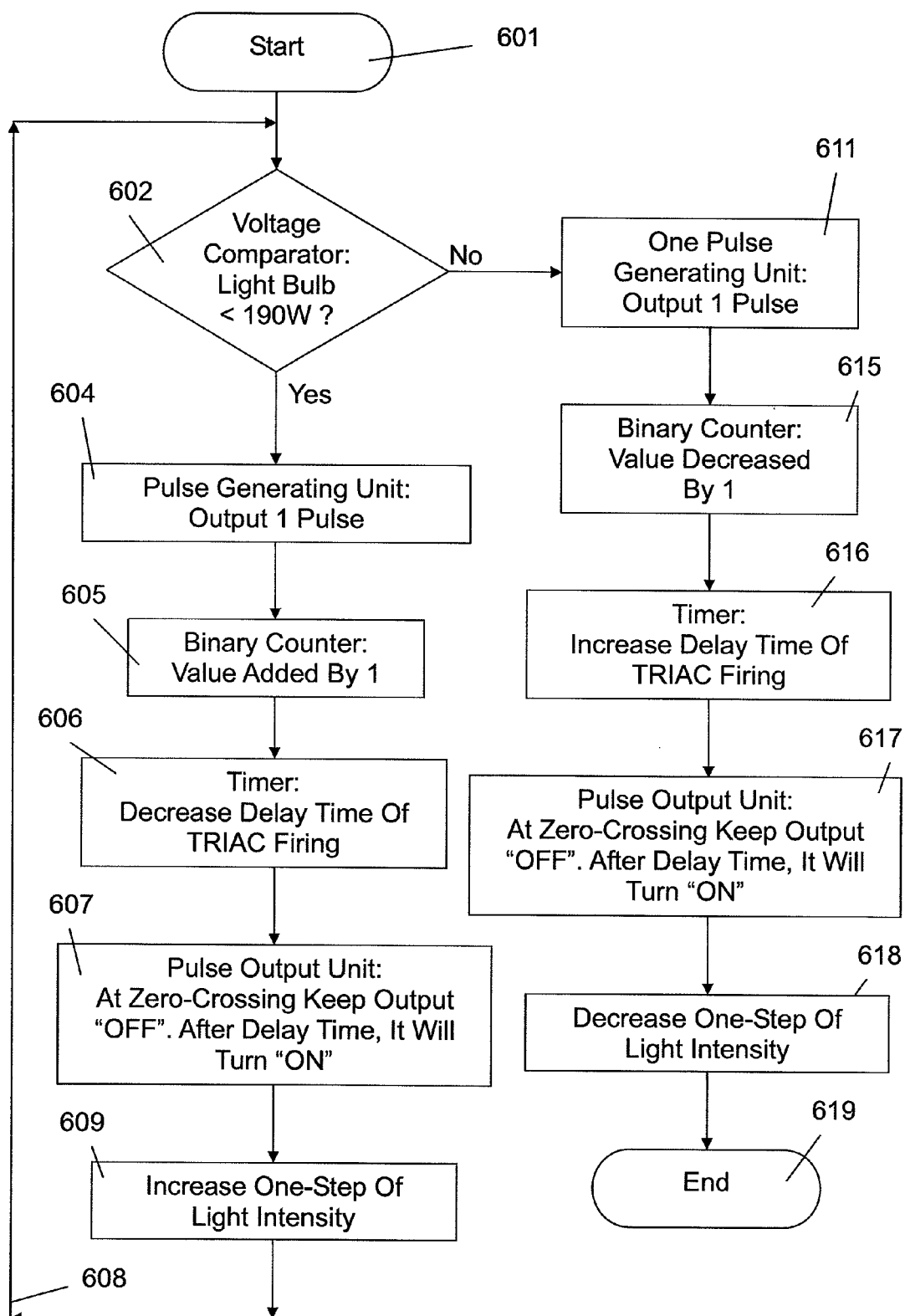
FIG. 15 is a flow chart illustrating the operation of the protection circuit of FIG. 14.
Figure 16A:
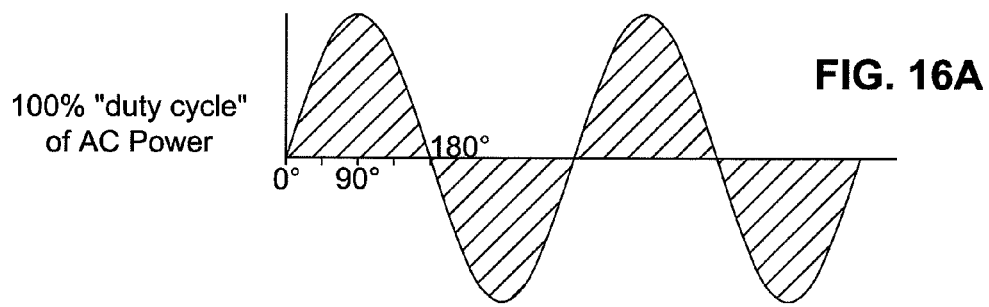
FIGS. 16A to 16N are waveform diagrams of the operating voltage of the light kit, at progressively reducing duty cycles resulting from phase control implemented by the protection circuit of FIG. 4.
Figure 16B:
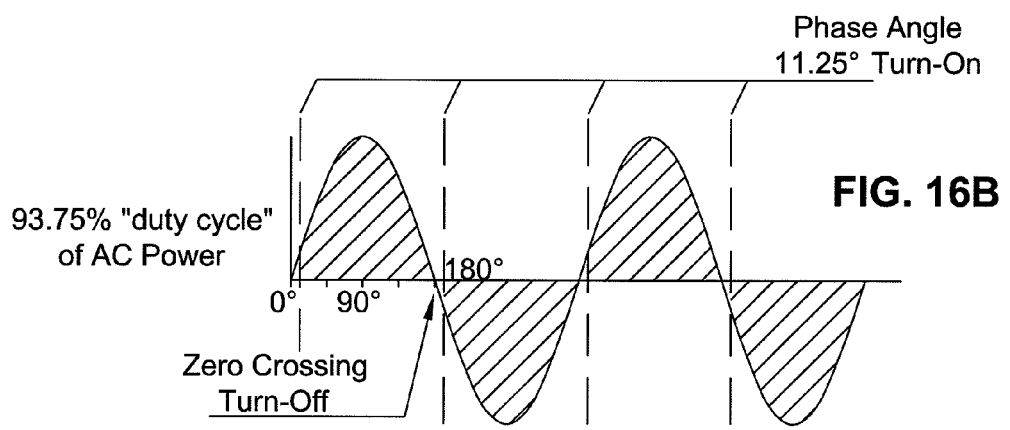
Figure 16C:
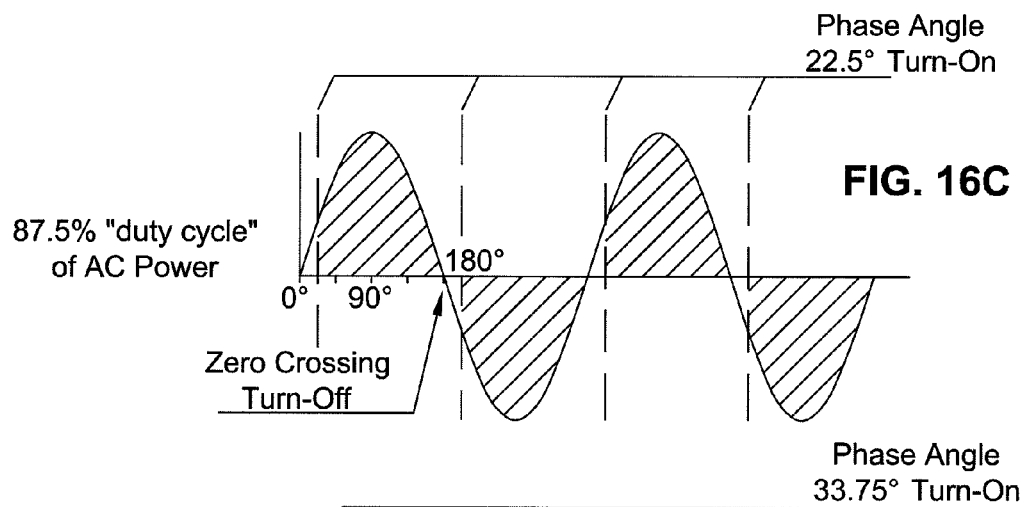
Figure 16D:
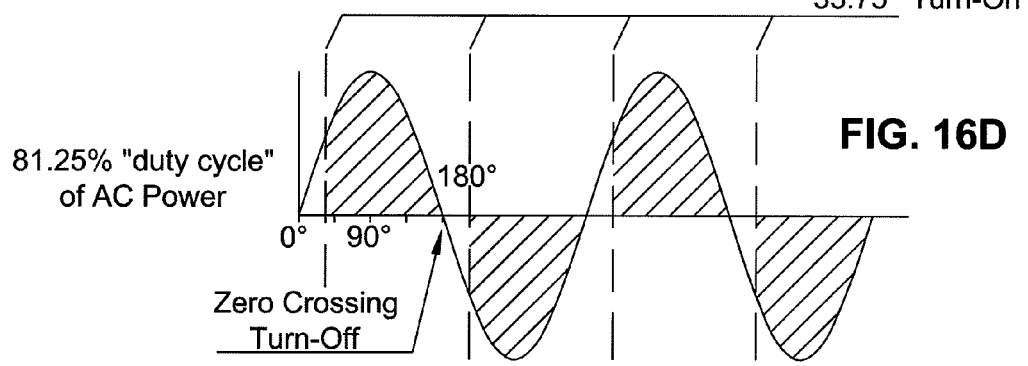
Figure 16E:
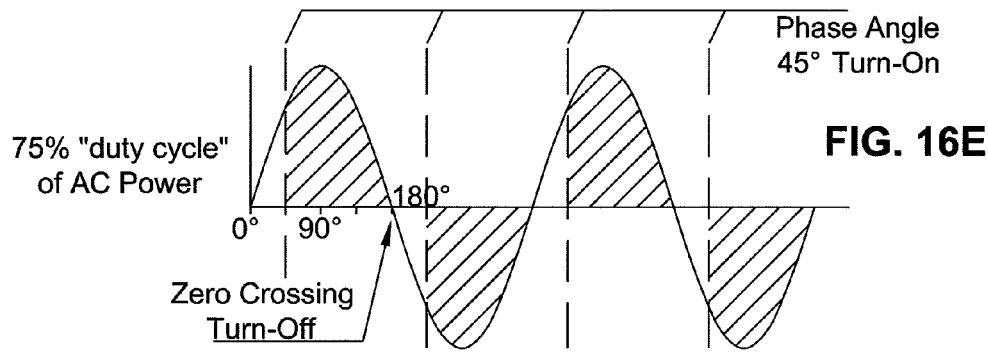
Figure 16F:
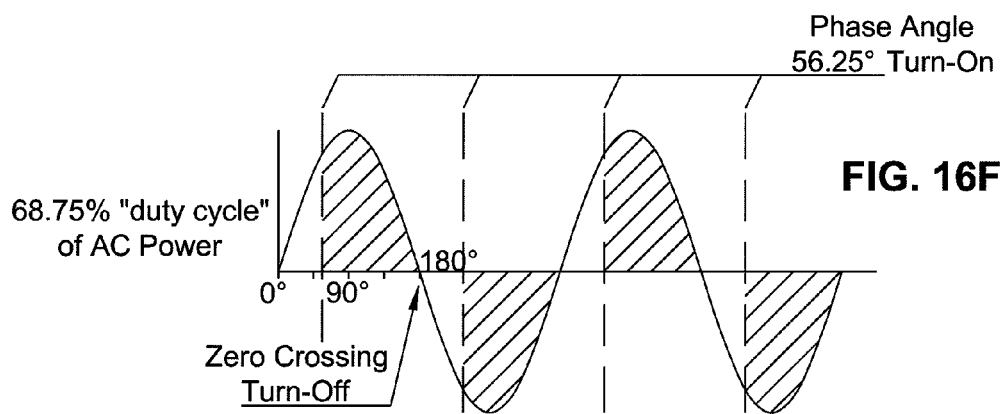
Figure 16G:
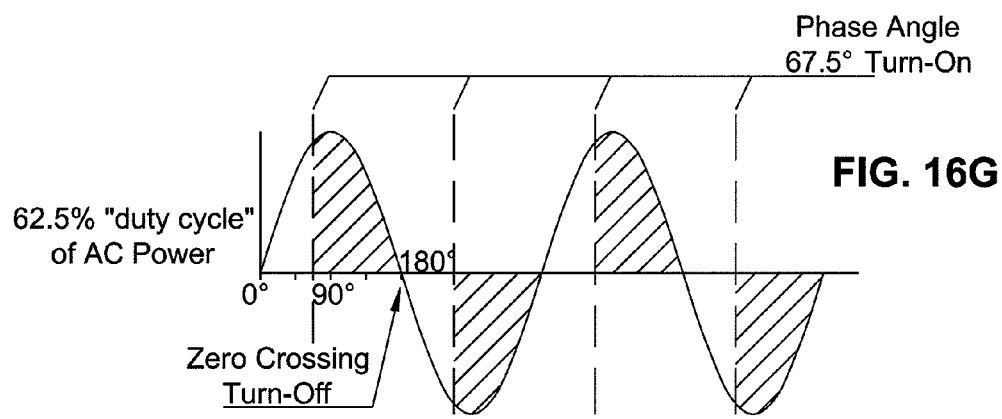
Figure 16H:
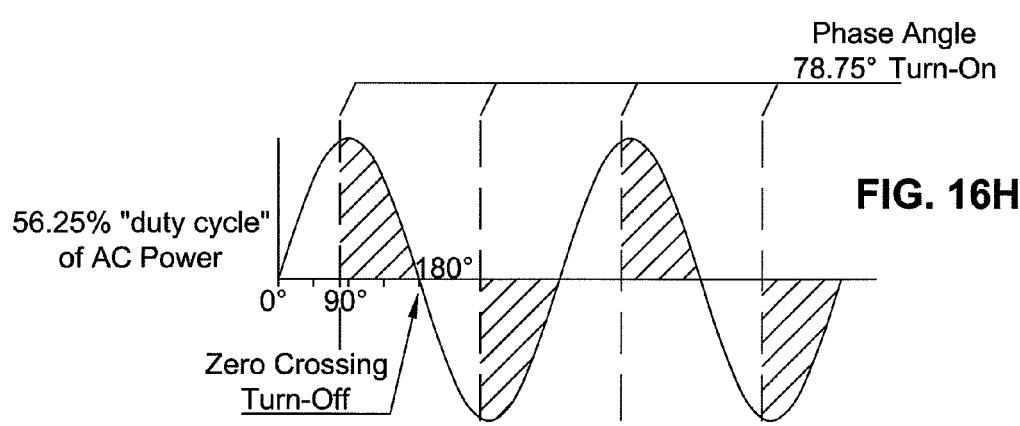
Figure 16I:
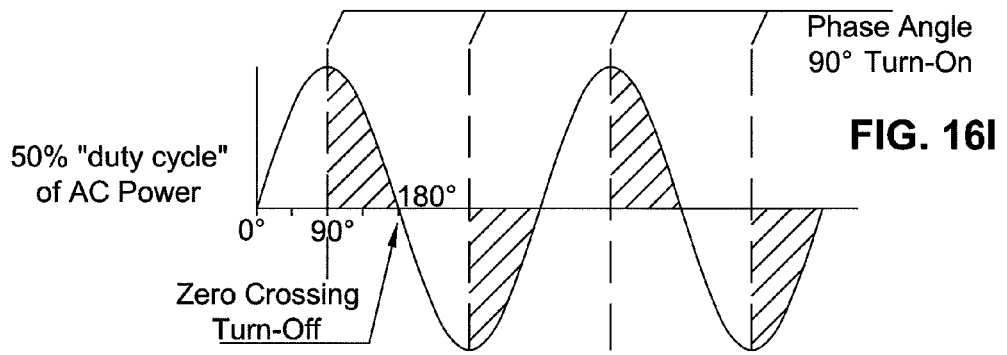
Figure 16J:
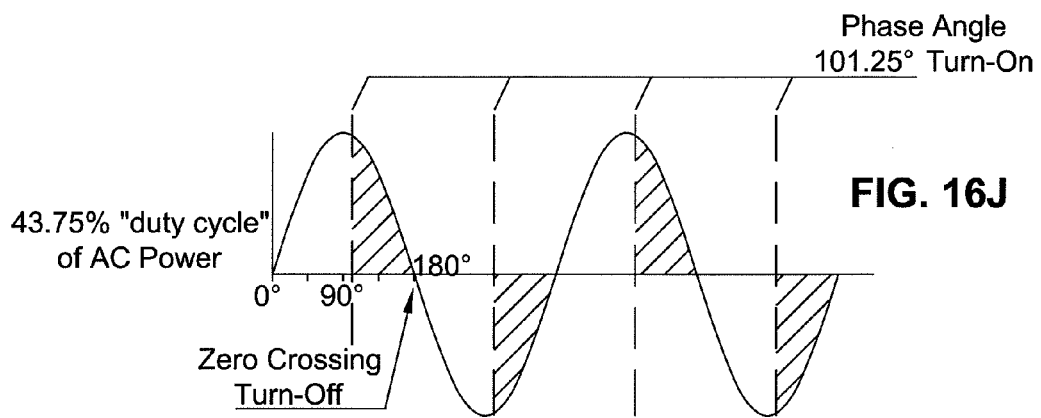
Figure 16K:
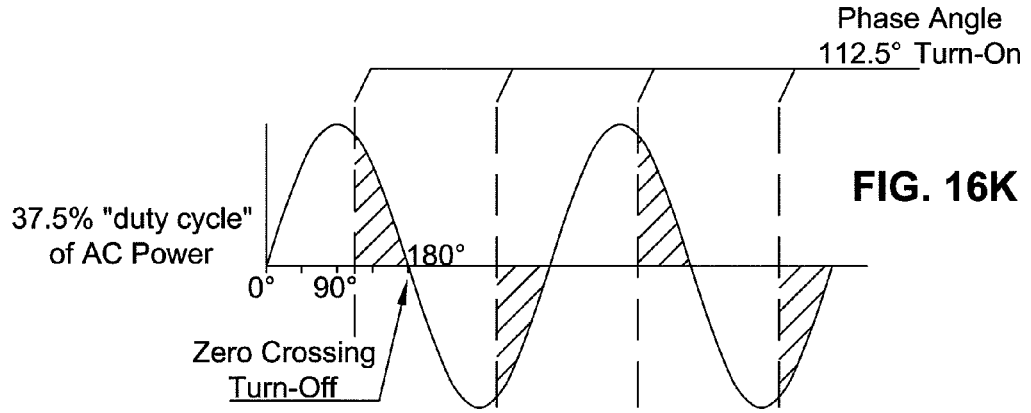
Figure 16L:
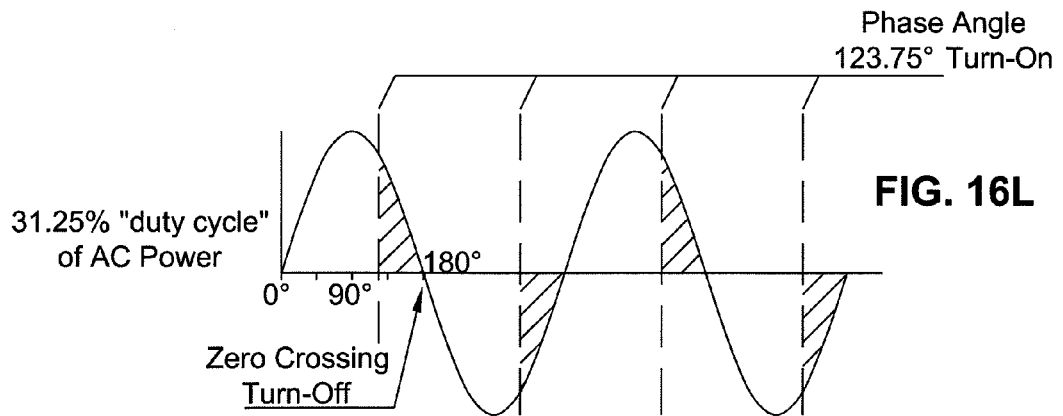
Figure 16M:
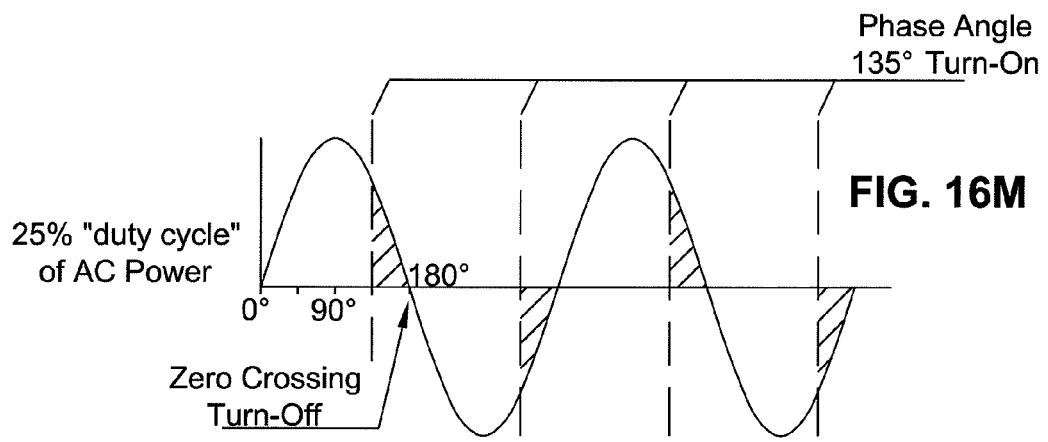
Figure 16N:
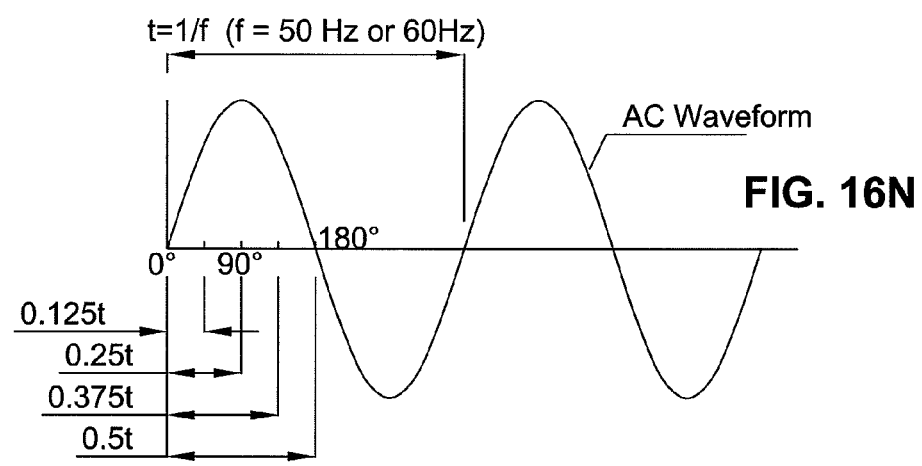

Referring finally to the sixth protection circuit 600 shown in FIGS. 14 and 15, it has a similar design similar to that of the fourth protection circuit 400, with the majority of equivalent components designated by the same reference numerals increased by 200, except for the reference signs comprising alphabets that remain the same.

As one major difference, the protection circuit 600 includes a "one" pulse generating unit 641 which is connected between the voltage comparator 630 and the counter 660, in parallel with the pulse generating unit 640. Both units 640 and 641 are controlled by a common output of the voltage comparator 630, but the latter operates in a different manner.

The voltage comparator 630 is arranged to provide a reversed, low output signal (i.e. falling from logic high to logic low like the falling edge of a pulse signal) upon detecting the light kit L operating at a power below the limit of 190 W, for as long as such an under-power operating condition prevails. The pulse generating unit 640 is activated in response to such a low output signal.

When the light kit L changes to operate above 190 W, the voltage comparator 630 will then provide a high output signal (i.e. rising from logic low to logic high like the rising edge of a pulse signal). The "one" pulse generating unit 641 is activated in response to such a high output signal.

The binary counter 660 is programmed to advance one count and output the resultant count at its output pins Q0 to Q3, each time (i.e. every 0.1 s) when it receives a trigger pulse from the pulse generating unit 640 while the light kit L operates below 190 W. Upon receiving a trigger pulse from the "one" pulse generating unit 641 when the light kit L changes to operate above 190 W, the counter 660 will finally reduce its count by one.

Another major difference lies in the operation of the timer 672, which is programmed not only to increase the delay in time from zero crossing when a firing pulse should be issued (i.e. the firing angle) for the triac 654, but also to reduce the same. The timer 672 has a default initial setting corresponding to a firing angle of 135°, which represents the minimum power at which the light kit L is to operate and to start operation.

Upon switch-on (step 601), the light kit L operates below 190 W as detected by the voltage comparator 630 (step 602). Under the control of the pulse generating unit 640 (step 604) via the counter 660 (step 605), the timer 672 reduces the firing angle by one step of 11.25° (step 606) from 135° (i.e. the initial firing angle). The triac 654 will then be turned on at a reduced firing angle (step 607), thereby increasing the intensity of the light kit L by one step (step 609).

The counter 660 will then count up one count for one time, or for more than one time i.e. repeated every 0.1 s if necessary (step 608), to cause the timer 672 to progressively reduce the firing angle from 123.75°, 112.5°, ..., 22.5°, 11.25° to 0° (see FIGS. 16M to 16A) in steps of 11.25°, thereby increasing the operating power and hence intensity of the light kit L. This operation will stop as soon as the power consumption of the light kit L exceeds 190 W, in case the light bulbs 5 have a power rating that is too high.

Accordingly, the counter 660 starts operation in the same manner as the earlier counterpart under the control of the pulse generating unit 640, but it adjusts (increases) the power consumption gradually from minimum power until the light kit L consumes more than 190 W.

When this occurs (step 602), the "one" pulse generating unit 641 is then activated instead to trigger (step 611) the counter 660 to count down one count (step 615), thereby causing the timer 672 to increase the firing angle by one step of 11.25° (step 616). This restores the firing angle for the triac 654 (step 617) to the immediately preceding value at which the light kit L operates just below 190 W, whereby the lighting intensity is reduced by one step back (step 618), and the operation finally ends (step 619).

The whole process of operation of the protection circuit 500/600 will be performed each time the light kit L is switched on. The light bulbs 5 will gradually lit up, progressively in steps (each 0.5 s/0.1 s), in one or two seconds from being switched on. If the light bulbs 5 exceed the designated power limit, they will be dimmed by one step back from the brightest intensity just beyond the limit, so that the power consumption is contained within the limit.

The invention has been given by way of example only, and various modifications of and/or alterations to the described embodiments may be made by persons skilled in the art without departing from the scope of the invention as specified in the appended claims.

The invention claimed is:

1. A protection circuit for limiting operating power of an electrical device, in a circuit connected to an electrical power source, to below a predetermined power rating, the protection circuit comprising:
    a switching device for adjusting electrical power supplied from the power source to the electrical device;
    a sensor for sensing a parameter relating to the operating power of the electrical device; and
    a comparator for comparing the parameter sensed by the sensor to identify an undesirable operating condition in which the electrical device operates at a power exceeding the predetermined power rating and for, in response to identifying an undesirable operating condition, providing an output signal for controlling the switching device to adjust the electrical power supplied to the electrical device to below the predetermined power rating, while maintaining an electrical current flow through the electrical device, wherein the switching device comprises a relay arranged to switch between first and second circuits, the first circuit providing normal connection of the electrical device to the power source, and the second circuit providing connection of the electrical device to the power source upon identifying the undesirable condition.

2. The protection circuit as claimed in claim 1, wherein the sensor comprises a voltage sensing device for sensing operating voltage of the electrical device, the operating voltage being the parameter.

3. The protection circuit as claimed in claim 2, wherein the voltage sensing device comprises a first resistor connected in series between the electrical device and the power source, the resistor having a first end connected at a first side of the electrical device for sensing the operating voltage of the electrical device.

4. The protection circuit as claimed in claim 3, wherein the comparator comprises a voltage comparator having a first input connected via a second resistor to the first end of the first resistor to input the operating voltage of the electrical device, and a second input connected to a second end of the first resistor connected at a side of the power source to input the voltage appearing at the second end of the first resistor as a reference for comparison.

5. The protection circuit as claimed in claim 4, wherein the second end of the first resistor is directly connected to the power source such that the voltage of the power source is taken as the reference.

6. The protection circuit as claimed in claim 1, wherein the sensor comprises a current sensing device having a resistor connected in series between the electrical device and the power source to sense operating current of the electrical device, the operating current being the parameter.

7. The protection circuit as claimed in claim 6, wherein the comparator comprises a voltage comparator having two inputs to which opposite ends of the resistor are connected, respectively, for comparing potential difference developed across the resistor by the operating current to identify the undesirable operating condition.

8. The protection circuit as claimed in claim 1, wherein the first circuit is of relatively low resistance, and the second circuit is of relatively large resistance reducing electrical power supplied to the electrical device to below the predetermined power rating.

9. The protection circuit as claimed in claim 1, wherein the switching device includes a solid state switch for connecting the electrical device to the power source, the solid state switch having a control terminal switchable by the relay between the first and second circuits to control duty cycle of conduction of the solid state switch.

10. The protection circuit as claimed in claim 9, wherein the solid state switch comprises a triac having a control terminal controlled by a capacitor that is charged via one of the first and second circuits, as switched by the relay.

11. The protection circuit as claimed in claim 1, including a latching unit connected between the comparator and the relay for latching the output signal of the comparator to the relay such that the relay stays activated.

12. The protection circuit as claimed in claim 1, wherein the relay comprises an electromagnetic relay having a switch and an electromagnet for operating the switch.

13. The protection circuit as claimed in claim 1, wherein the predetermined power rating is 190 watts.

14. A protection circuit for limiting operating power of an electrical device, in a circuit connected to an electrical power source, to below a predetermined power rating, the protection circuit comprising:

a switching device for adjusting electrical power supplied from the power source to the electrical device;
a sensor for sensing a parameter relating to the operating power of the electrical device; and
a comparator for comparing the parameter sensed by the sensor to identify an undesirable operating condition in which the electrical device operates at a power exceeding the predetermined power rating and for, in response to identifying an undesirable operating condition, providing an output signal for controlling the switching device to adjust the electrical power supplied to the electrical device to below the predetermined power rating, while maintaining an electrical current flow through the electrical device, wherein
the switching device comprises a solid state switch for connecting the electrical device to the power source, and
the solid state switch has a control terminal, and a trigger unit connected to the control terminal for, in response to the output signal of the comparator, providing a series of timed trigger signals to turn on the solid state switch at progressively different firing angles, each firing angle extending over a predetermined time interval, thereby controlling duty cycle of conduction of the solid state switch.

15. The protection circuit as claimed in claim 14, including a controller connected between the comparator and the trigger unit for controlling timing and the firing angle of each of the trigger signals of the trigger unit.

16. The protection circuit as claimed in claim 15, wherein the controller comprises a counter providing a series of control signals at the predetermined time intervals to control timing of the trigger signals provided by the trigger unit.

17. The protection circuit as claimed in claim 16, wherein
the trigger unit comprises a capacitor and a plurality of resistance paths connected to the control terminal of the solid state switch,
each of the resistance paths has a different resistance for progressively adjusting charging time of the capacitor and, in turn, the firing angle of the trigger signals provided by the trigger unit, and
the resistance paths are alternatively activated by respective control signals of the counter.

18. The protection circuit as claimed in claim 17, wherein
the counter has a plurality of outputs for outputting respective control signals, and
each of the resistance paths comprises a resistor and a solid state switch having a control terminal connected to a respective output of the counter for activation by the counter.

19. The protection circuit as claimed in claim 16, wherein the controller includes a timer connected to the trigger unit for progressively adjusting the firing angles of the trigger signals of the trigger unit, in response to each control signal provided by the counter.

20. The protection circuit as claimed in claim 19, wherein the counter has at least one output connected to the timer for outputting the series of control signals to the timer, the control signals being binary signals.

21. The protection circuit as claimed in claim 14, wherein the controller operatively increases the firing angles of the trigger signals of the trigger unit to reduce the duty cycle of conduction of the solid state switch to reduce the electrical power to below the predetermined power rating.

22. The protection circuit as claimed in claim 14, wherein the controller operatively reduces the firing angles of the trigger signals of the trigger unit to increase the duty cycle of conduction of the solid state switch to increase the electrical power until the electrical power exceeds the predetermined power rating, and, subsequently, increases the firing angles of the trigger signals of the trigger unit to reduce the duty cycle of conduction of the solid state switch to reduce the electrical power to below the predetermined power rating.

23. A protection circuit for limiting operating power of an electrical device, in a circuit connected to an electrical power source, to below a predetermined power rating, the protection circuit comprising:
   a switching device for adjusting electrical power supplied from the power source to the electrical device;
   a sensor for sensing a parameter relating to the operating power of the electrical device; and
   a comparator for comparing the parameter sensed by the sensor to identify an undesirable operating condition in which the electrical device operates at a power exceeding the predetermined power rating and for, in response to identifying an undesirable operating condition, providing an output signal for controlling the switching device to adjust the electrical power supplied to the electrical device to below the predetermined power rating, while maintaining an electrical current flow through the electrical device, wherein the switching device is arranged to deliver electrical power from the power source to the electrical device at maximum power, initially, and, subsequently, to reduce the electrical power to below the predetermined power rating.

24. A method of limiting operating power of an electrical device, in a circuit connected to an electrical power source, to below a predetermined power rating, the method comprising:
   (a) connecting a switching device to the electrical device for adjusting electrical power supplied from the power source to the electrical device;
   (b) sensing a parameter relating to operating power of the electrical device;
   (c) using the parameter sensed by the sensor to identify an undesirable operating condition in which the electrical device operates at a power exceeding the predetermined power rating; and
   (d) in response to identifying an undesirable operating condition, controlling the switching device to adjust electrical power supplied to the electrical device to below the predetermined power rating, while maintaining an electrical current flow through the electrical device, wherein the switching device includes a relay and (a) includes arranging the relay to switch between first and second circuits, with the first circuit providing normal connection of the electrical device to the power source, and the second circuit providing connection of the electrical device to the power source upon identifying the undesirable operating condition.

25. The method as claimed in claim 24, wherein (a) includes providing the first circuit with relatively low resistance, and providing the second circuit with relatively large resistance to reduce electrical power supplied to the electrical device to below the predetermined power rating.

26. The method as claimed in claim 24, wherein the switching device includes a solid state switch having a control terminal, and
   (a) includes using the relay to switch between the first and the second circuits of different resistances to control duty cycle of conduction of the solid state switch.

27. The method as claimed in claim 26, wherein
   the solid state switch includes a triac having a control terminal, and
   (a) includes controlling the control terminal with a capacitor charged via one of the first and second circuits as switched by the relay.

28. A method of limiting operating power of an electrical device, in a circuit connected to an electrical power source, to below a predetermined power rating, the method comprising:
   (a) connecting a switching device to the electrical device for adjusting electrical power supplied from the power source to the electrical device;
   (b) sensing a parameter relating to operating power of the electrical device;
   (c) using the parameter sensed by the sensor to identify an undesirable operating condition in which the electrical device operates at a power exceeding the predetermined power rating; and
   (d) in response to identifying an undesirable operating condition, controlling the switching device to reduce electrical power supplied to the electrical device to below the predetermined power rating while maintaining an electrical current flow through the electrical device.

* * * * *